United States Patent [19]
Tsunoda

[11] Patent Number: 5,905,601
[45] Date of Patent: May 18, 1999

[54] APPARATUS FOR REPRODUCING DATA HAVING A RESTART READ GATE SIGNAL GENERATOR IN A DISK STORAGE SYSTEM

[75] Inventor: Masahiko Tsunoda, Tokyo, Japan

[73] Assignee: Kabushiki Kaisha Toshiba, Kawasaki, Japan

[21] Appl. No.: 08/596,888

[22] Filed: Mar. 11, 1996

[30] Foreign Application Priority Data

May 16, 1995 [JP] Japan ................................. 7-117498

[51] Int. Cl.$^6$ .................................................. G11B 5/09
[52] U.S. Cl. .............................................. 360/51; 360/53
[58] Field of Search ........................... 360/51, 53; 369/48

[56] References Cited

U.S. PATENT DOCUMENTS 5,278,815  1/1994  Mashimo et al. ....................... 369/48
5,313,340  5/1994  Takayama et al. ................... 360/51 X
5,327,300  7/1994  Satomura ................................ 360/51

*Primary Examiner*—Aristotelis M. Psitos
*Assistant Examiner*—Alan Faber
*Attorney, Agent, or Firm*—Limbach & Limbach LLP

[57] ABSTRACT

In a data reproducing device using a read channel of a PRML system, during a period of a continuous reproducing operation mode for continuous reproduction processing of adjacent data sectors, a restart RG generator switches a restart read gate signal RRG ON in synchronization with switching ON of a reference read gate signal RG. Therefore, when data is reproduced from a data sector before continuous data sectors, data reproduction processing is started by means of the restart read gate signal RRG equivalent to the reference read gate signal RG. When data is continuously reproduced from a next data sector adjacent to the previous data sector, the restart RG generator keeps the restart read gate signal ON for a predetermined period of time before the reference read gate signal RG is generated.

8 Claims, 22 Drawing Sheets

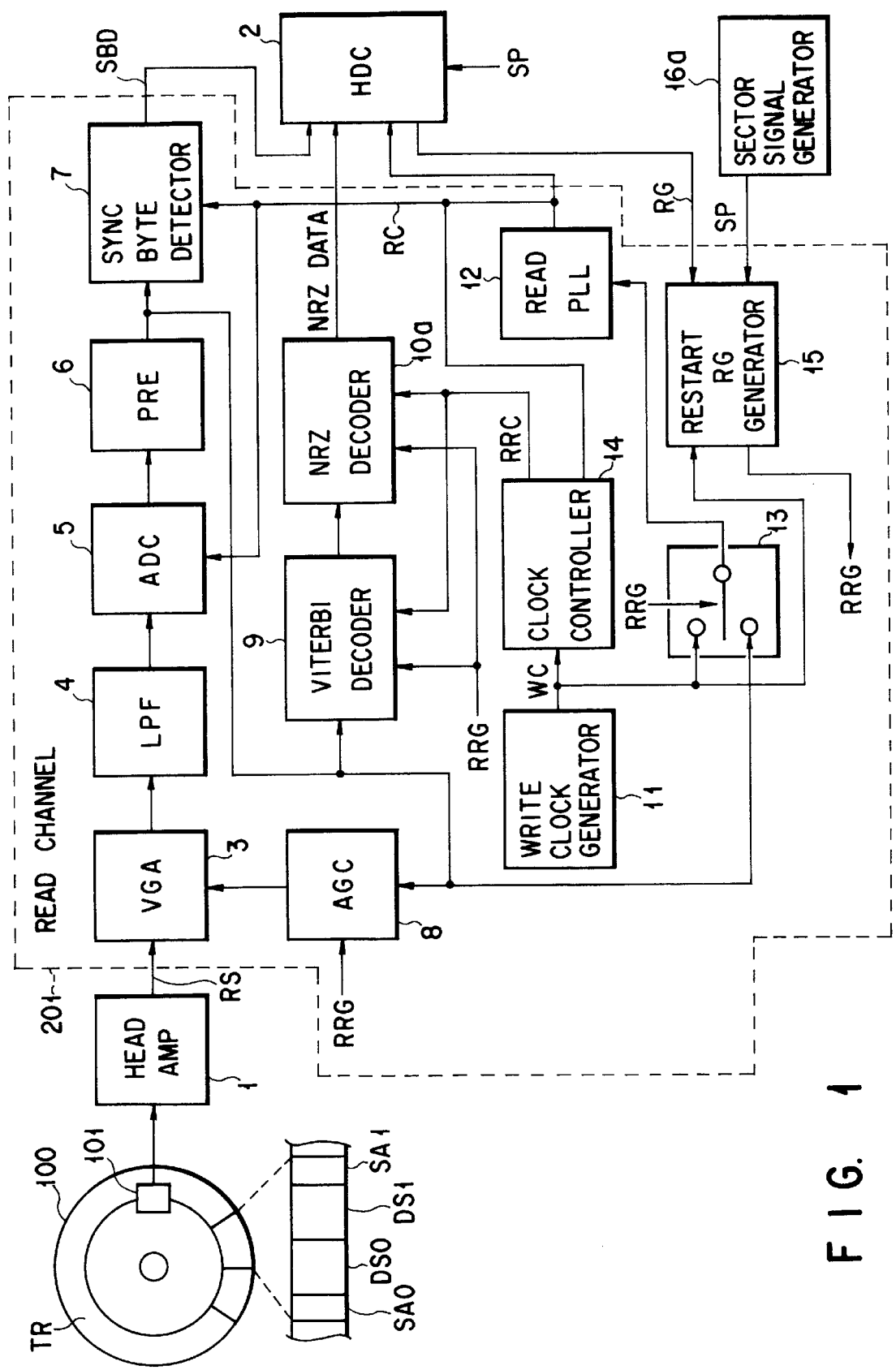
F I G. 1

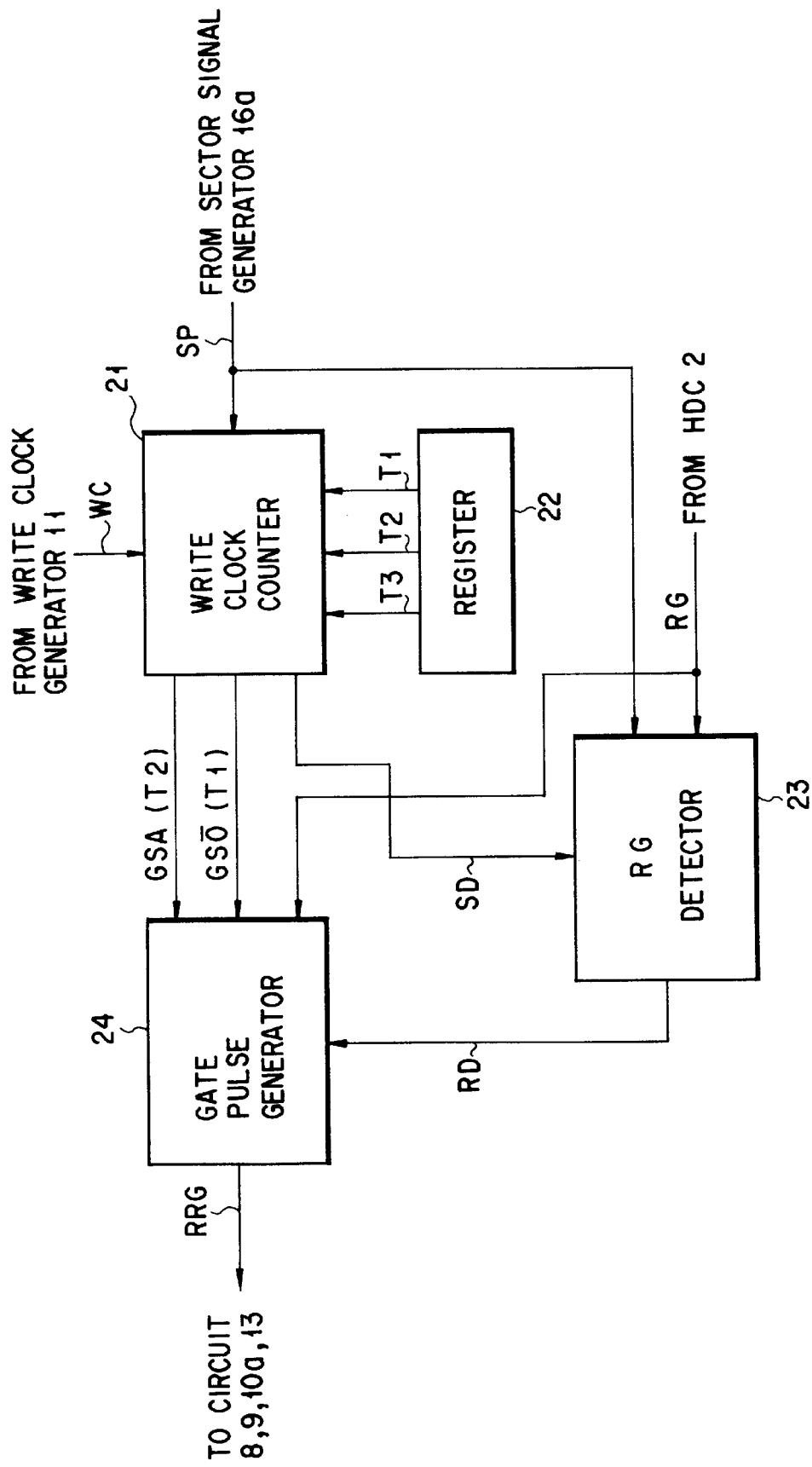
F I G. 2

F I G. 4A  RG

F I G. 4B  RRG

F I G. 4C  NRZ DATA

F I G. 4D  RRC

F I G. 4E  RC

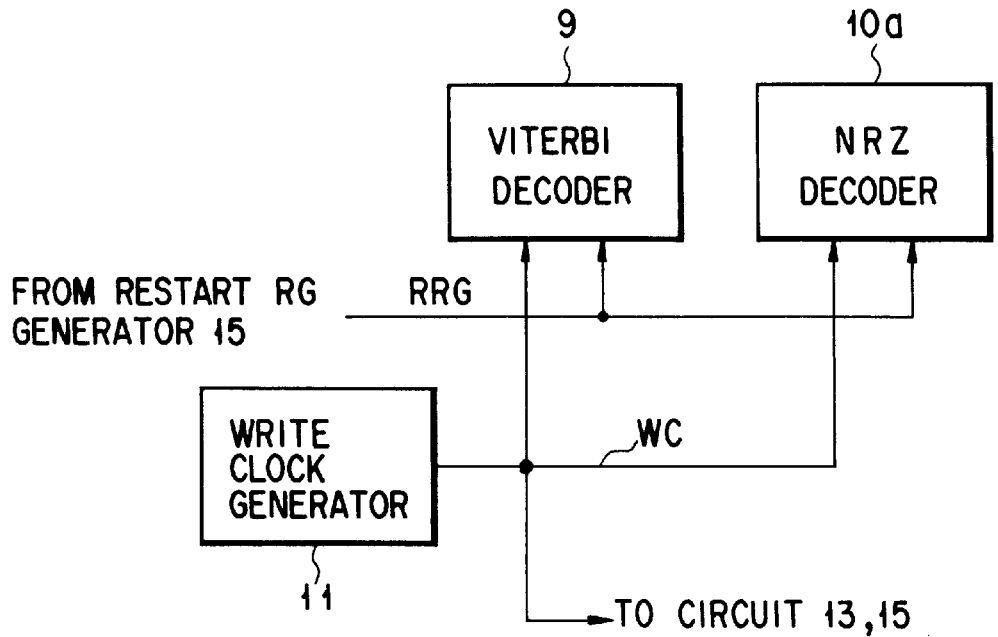
F I G. 5
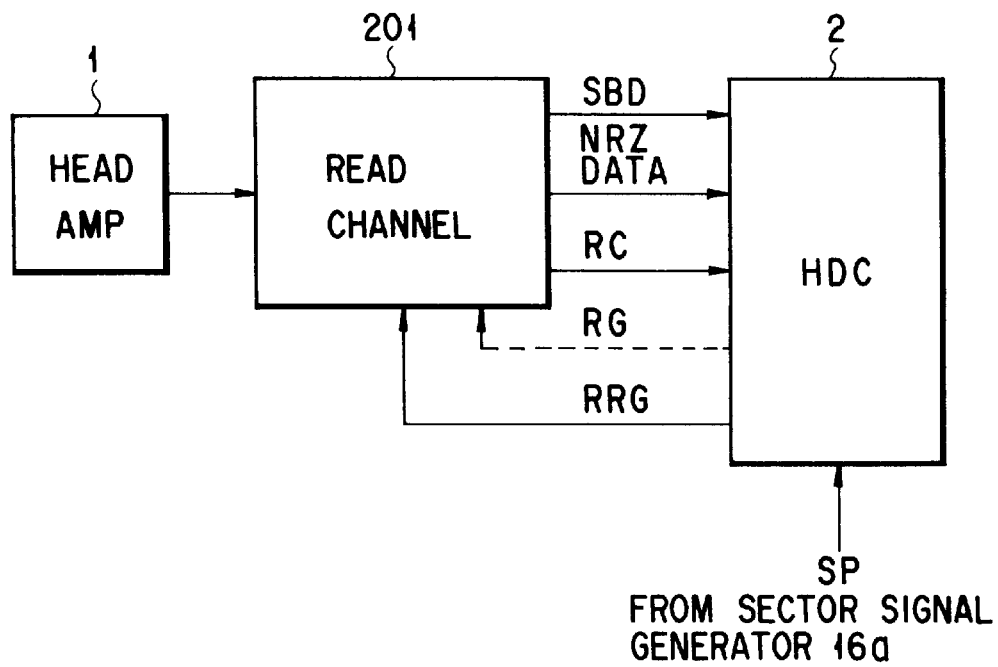
F I G. 6

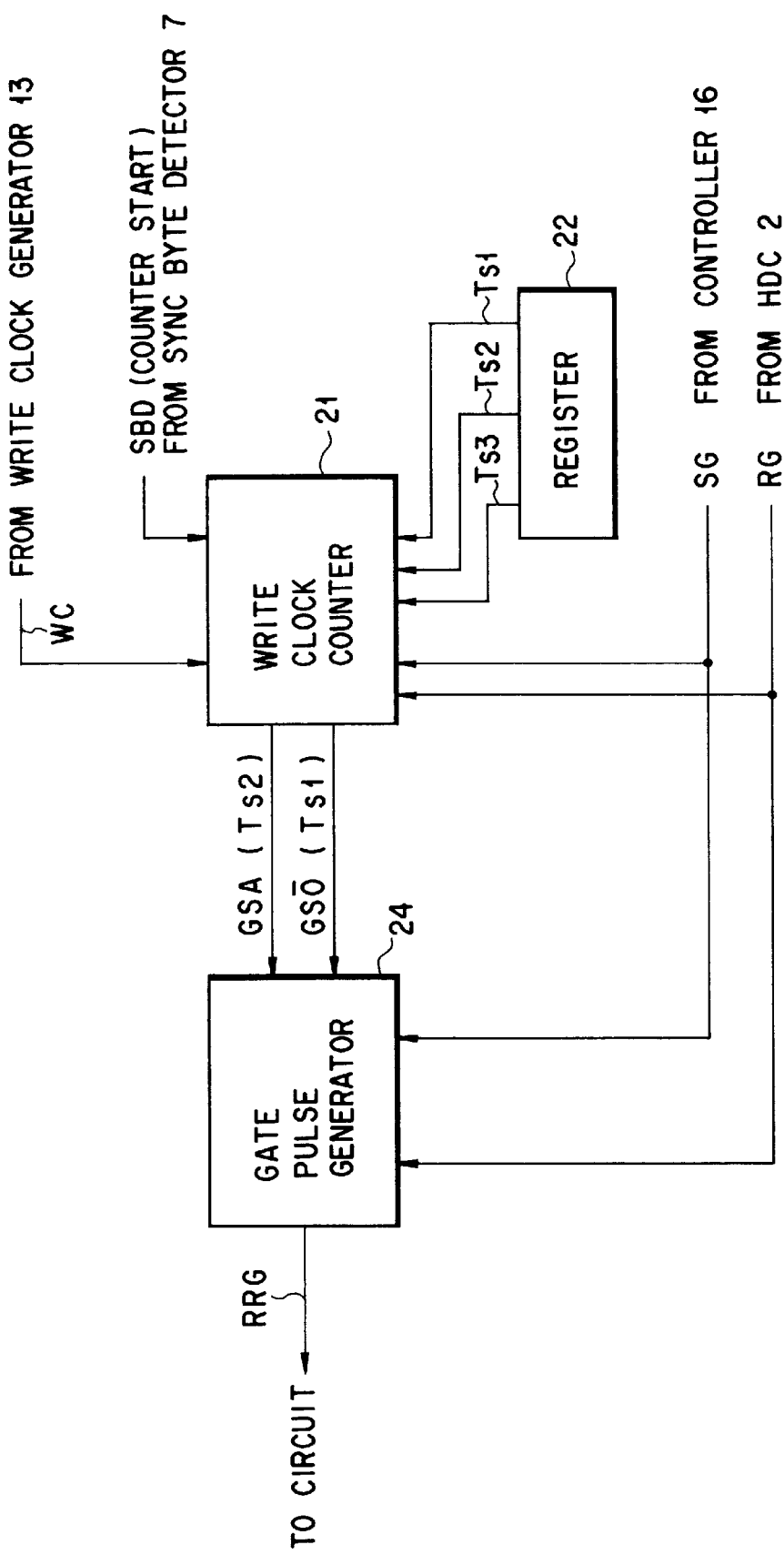
F I G. 14

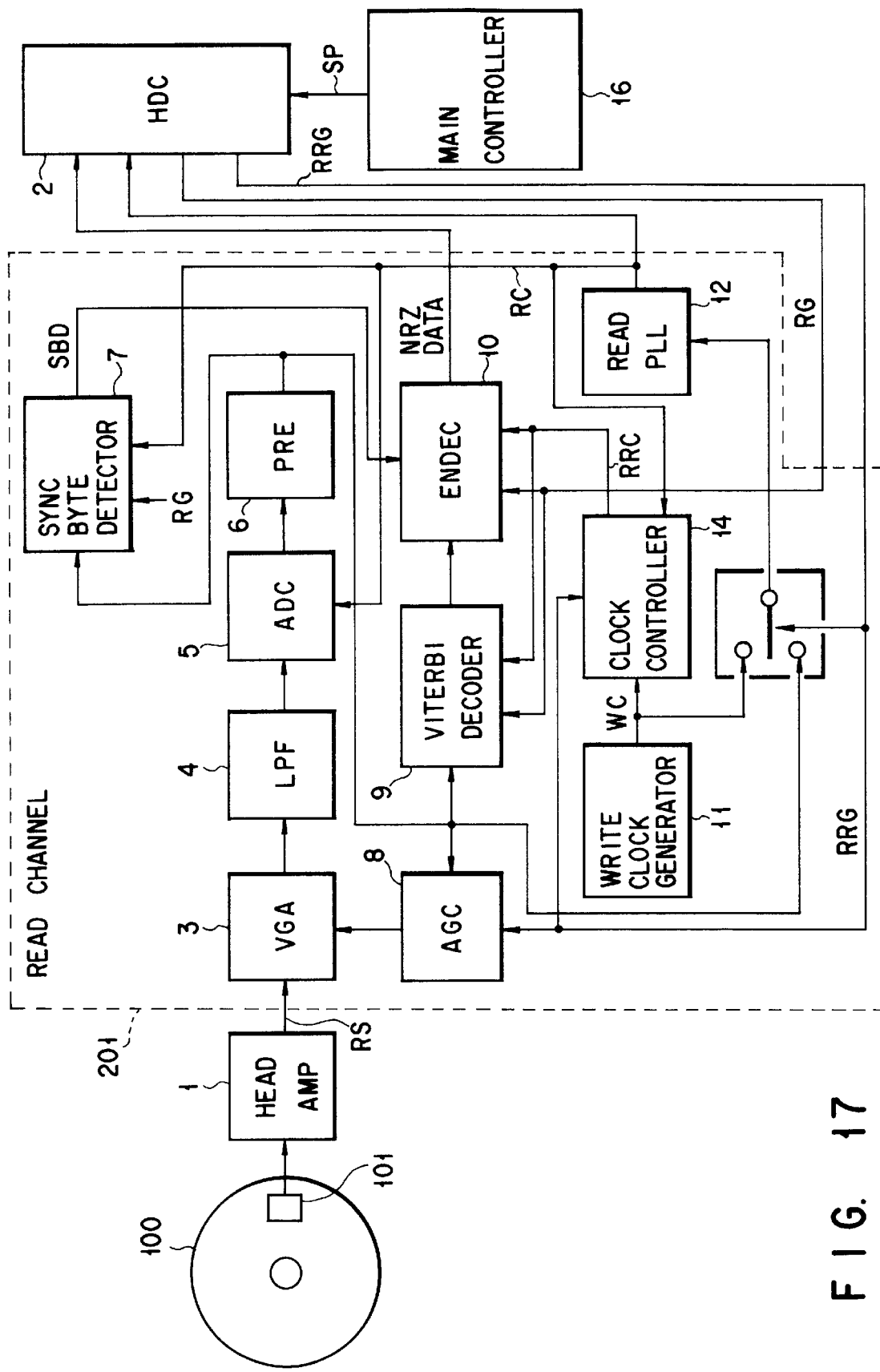
F I G. 17

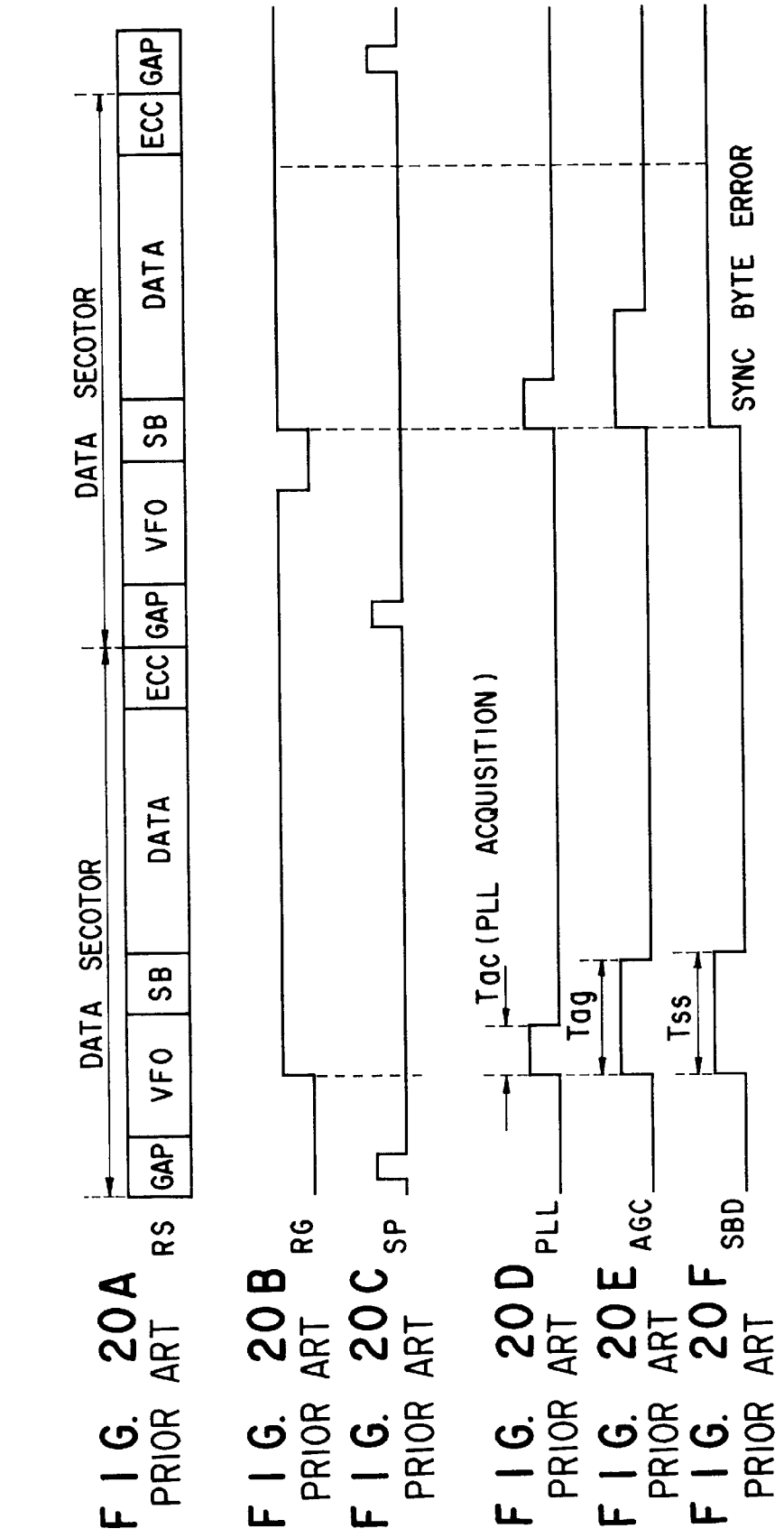

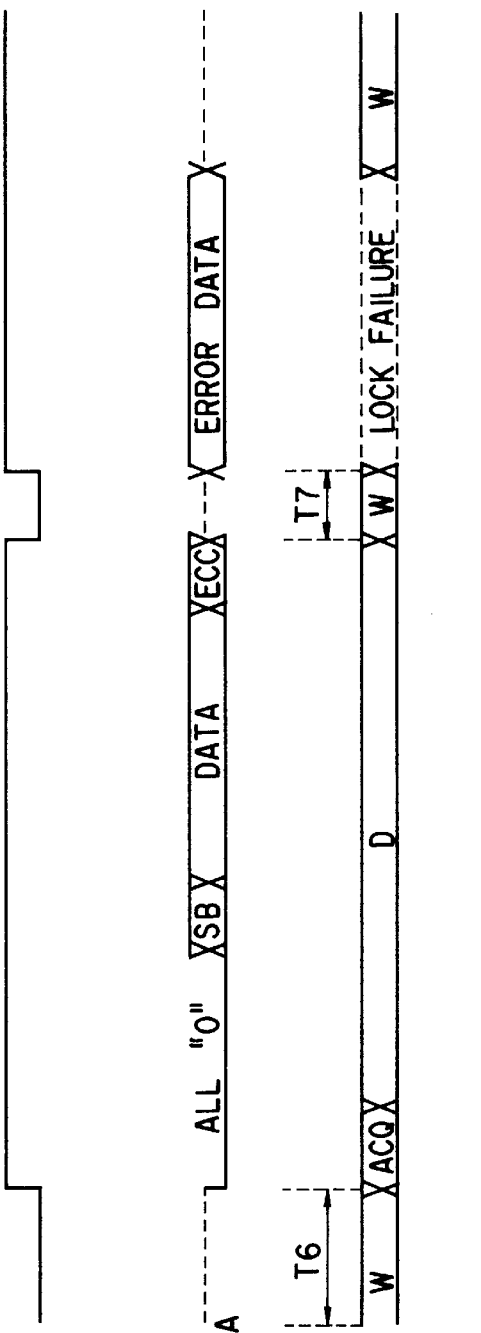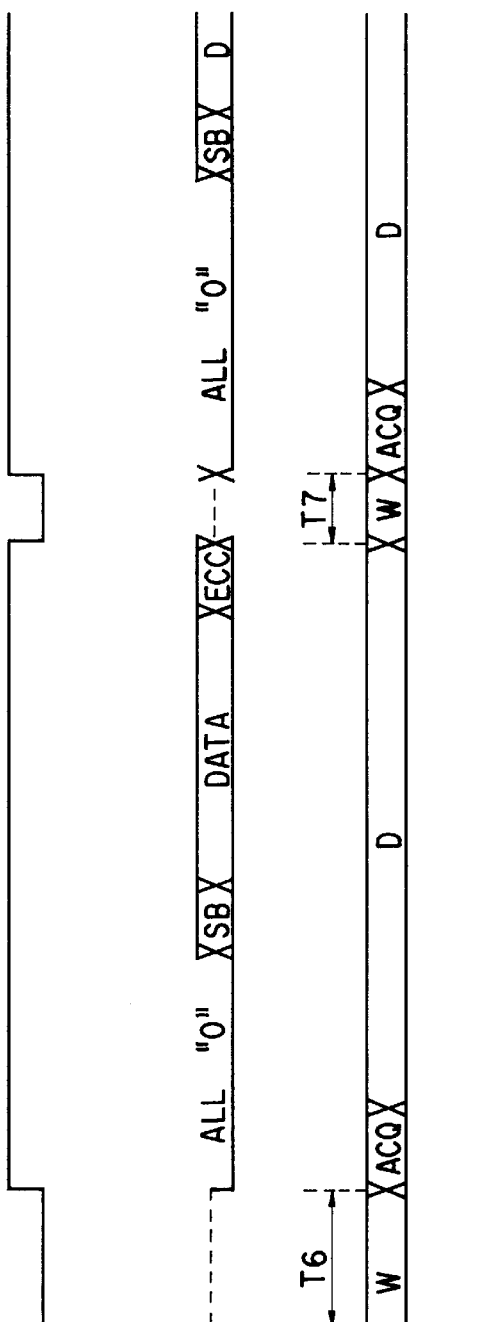

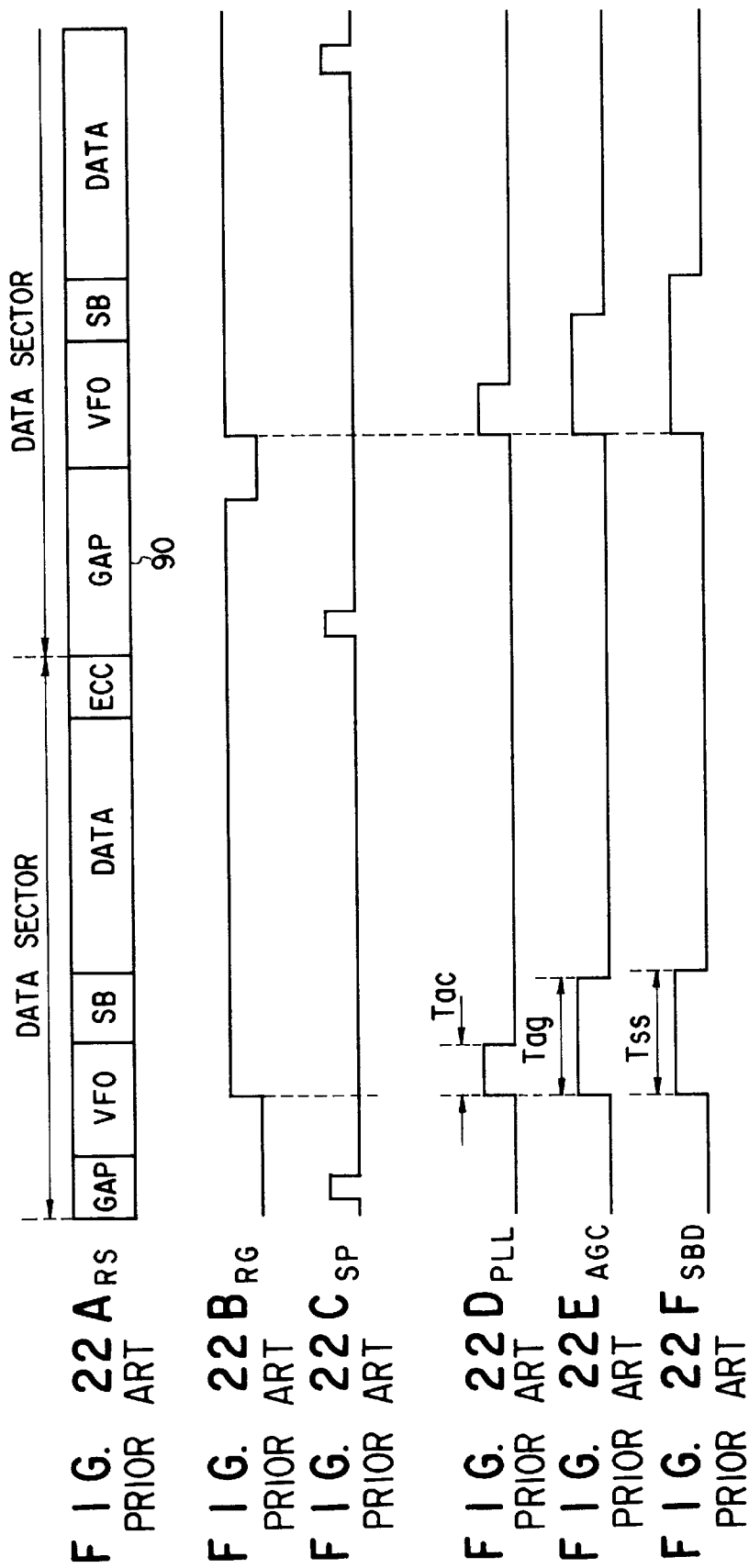

APPARATUS FOR REPRODUCING DATA HAVING A RESTART READ GATE SIGNAL GENERATOR IN A DISK STORAGE SYSTEM

BACKGROUND OF THE INVENTION

1. Field of the Invention

The present invention relates to a data reproducing device used in, for instance a hard disk drive, and having, in particular a read channel of a PRML system.

2. Description of the Related Art

Conventionally, as shown in FIG. 19, a hard disk drive (HDD) is provided with a read channel 200 for performing reproducing processing, by which recorded data is reproduced by inputting a read signal read from a disk 100 by means of a head 101. Recorded data is write data of, for instance a NRZ (non return to zero) code output from a disk controller (HDC) 2 when this is recorded in the disk 100. During a data recording operation, the recorded data (NRZ data) is modulated to a write signal of a RLL (run length limited) code by means of an ENDEC (encoder and decoder) and sent to the head 101.

A number of tracks TR are constructed in the disk 100 and each track TR is provided with a plurality of data sectors arrayed in a circumferential direction. In a CDR (constant density recording) system, as shown in FIG. 19, a plurality of data sectors DS0 and DS1 are disposed between servo areas SA0 and SA1. The number of data sectors per track is different from zone to zone including a plurality of tracks. A zone is equivalent to a group when a number of tracks TR are divided into a plurality of groups in a radial direction of a disk. By means of such a data format structure, it is possible to make data recording densities almost uniform among the zones. In the servo areas SA0 and SA1, servo data are recorded so as to position the head 101 in an access target position (target track).

The read channel is, as shown in FIG. 19, for reproducing a read signal RS output from a head amplifier 1 and outputting reproduced recorded data NRZ data to the HDC 2 together with a read clock (synchronous clock signal) RC output from a read PLL (phase locked loop) 12. The head amplifier 1 is for amplifying a read signal read by means of the head 101.

With an increase in a HDD storage capacity in recent years, there has been presented, as a technique for realizing a high recording density of a disk, a read channel employing a signal processing technique called a PRML (Partial Response Maximum Likelihood) system.

The read channel of this PRML system is a circuit including a PR (Partial Response) equalizer (PRE) 6 and a viterbi decoder 9 of a maximum likelihood decoding system for selecting a most reliable string for reproduction of precorrelated data strings. The PRML system is advantageous compared with a conventional peak detecting system in that it is excellent in a S/N characteristic and an error rate is extremely low.

In addition to the above-described circuit elements, the read channel is provided with a variable gain amplifier (VGA) 3 gain-controlled by means of an automatic gain controller (AGC) 8, a low-pass filter (LPF) 4, a A/D converter 5, a synch byte detection circuit 7, a ENDEC (including a NRZ decoder) 10, a write clock generation circuit 11 and a clock switching circuit 13.

The VGA 3 holds a level of a read signal RS from the head amplifier 1 constant. The LPF 4 eliminates high-pass noises from the read signal RS. The A/D converter 5 converts the analog read signal RS into digital data.

The synch byte detection circuit 7 searches, as shown in FIG. 20A, a synch byte area (SB) of each data sector constituting a track format on a disk and outputs a detected signal SBD thereof to the HDC 2. Here, a format shown in FIG. 20A means not a track format on a disk but a format of the read signal RS read by means of the head 101. Each data sector is provided with a data area (DATA) in which user data (recorded data) is recorded. In the CDR system, the numbers of data sectors respectively arrayed between the servo areas are not the same. As described later, there is a format in which a data sector is divided sandwiching the servo area (data split).

In the synch byte area (SB), there is recorded information for acquiring synchronization when NRZ data is demodulated by byte unit by means of the decoder 10. A VFO area (PLL synch area) is for acquiring synchronization of a data identifying window and preamble data consisting of a synchronous pattern of a predetermined frequency. That is, the read PLL 12 executes an operation of phase acquisition within the range of the preamble data recorded in the VFO area. In FIG. 20D, a time Tac of the read PLL 12 indicates a phase acquisition time thereof.

The read channel usually starts data reproducing processing in synchronization with a start timing signal called a read gate RG supplied from the HDC 2. That is, as shown in FIG. 20B, data reproducing processing is started when the read gate RG is switched ON (logical level "H") and stopped when this is switched OFF (logical level "L").

In the HDD, a sector signal (pulse signal) SP for detecting a lead portion of each data sector is generated. The sector signal SP is generated by means of a main controller composed of a logic circuit of a gate array and a CPU. That is, the main controller is provided with a sector signal generator for generating the sector signal SP by using a signal read from the servo area by means of the head 101. The HDC 2 switches the read gate RG ON in synchronization with inputting of the sector signal SP when data reproducing processing is started.

With the read gate RG switched ON, as shown in FIGS. 20D and 20E, the read PLL 12 starts the phase acquisition operation and the AGC 8 starts an operation of controlling a gain of the VGA 3 so as to make stable an amplitude of the read signal RS in a high-speed follow-up mode (time Tag). The synch byte detection circuit 7 starts searching of a synch byte area (SB) (time Tss).

The ENDEC 10 outputs, as shown in FIGS. 21A and 21B, the NRZ data to the HDC 2 during the period of switching ON of the read gate RG to switching OFF. The HDC 2 switches the read gate RG OFF after recognizing ECC (error checking and correction) data. In FIG. 21C, "RC" is a timing chart indicating a state of controlling performed by a read lock RC output from the read PLL 12. "W" during the OFF period of the read gate RG (T6 and T7) means that the read PLL 12 is locked in a write clock pulse WC from the write clock generator 11.

The clock switching circuit 13 changes, when the read gate RG is switched OFF, a switch to an output side of the write clock generation circuit 11. When the read gate RG is ON, the clock switching circuit 13 changes the switch to an output side of the PR equalizer 6 so as to supply a synchronous clock in the VFO area of the read signal RS to the read PLL 12. "D" shown in FIG. 21C means digital data output from the A/D converter 5 with the read clock RC as a sample clock while the read gate RG is ON.

As mentioned above, the HDC 2 switches the read gate RG OFF after recognizing the ECC data. This ECC data is first input to the read channel 200 and output to the HDC 2 after a passage of proper delaying time. This is caused by circuit delaying of the viterbi decoder 9 or the ENDEC 10.

In particular, in the read channel of the PRML system, the NRZ decoder of the viterbi decoder 9 or the ENDEC 10 is constructed by a high-speed logic circuit, and in order to reduce power consumption an operational speed of the decoder is reduced by executing bit interleave processing and byte interleave processing in parallel.

Also, in the read channel of the high-speed PRML system, a pass-memory length of the viterbi decoder is made long structurally because of an increase in the number of taps for FIR (finite impulse response) filters (digital filter) constituting the digital system PR equalizer and thus circuit delaying time is further increased.

In the read channel having such a large decoder circuit delay, in particular when data are continuously reproduced from the adjacent data sectors, a synch byte detection error is generated and this will most likely cause a data reproducing error.

As a specific example, as shown in FIG. 20B, when the read gate RG is switched OFF to the previous data sector and this is switched ON to the next data sector, the HDC 2 switches the read gate RG ON to the next data sector after recognizing the ECC data of the previous data sector delayed equivalent to circuit delaying of the decoder. Therefore, the synch byte detection circuit 7 cannot search a synch byte area (SB) of the next data sector and this may cause a synch byte error (FIG. 20F). When the synch byte error occurs, as shown in FIG. 21C, a locking operation of the read PLL is not allowed and this will cause error data in the NRZ data.

In order to solve these problems, as shown in FIG. 22A, enlarging of a gap area of the data sector (GAP) 90 may be considered. In such a sector format, as shown in FIG. 22F, even when data are continuously reproduced, a synch byte area (SB) of the next data sector can be surely searched. Also, as shown in FIG. 23B, accurate NRZ data can be output. However, if the gap area (GAP) is made large, this will cause reduction in data format efficiency and a data recording density.

SUMMARY OF THE INVENTION

It is an object of the invention to provide, regarding a data reproducing device using, in particular a read channel of a PRML system, a high recording density disk recording/reproducing device as a result of surely executing reproduction of data from continuous data sectors without reducing data format efficiency even when a gap is made large.

According to the invention, a data reproducing device using, for instance a read channel of a PRML system is provided with a read gate for determining a start timing for reproducing a read signal read from a disk and a second generating means for generating a restart read gate signal with respect to a reference read gate signal generated by a first generating means provided, for instance in a HDC. This second generating means is provided, for instance inside the read channel and when data are continuously reproduced from adjacent data sectors, the restart read gate signal is switched ON with a specified timing coming before the reference read gate signal in synchronization with a sector pulse signal.

According to the invention, in initial time of data reproduction processing, the second generating means switches the restart read gate signal ON in synchronization with switching ON of the reference read gate signal. Thus, when data is reproduced from a previous data sector of the continuous data sectors, data reproduction processing is started by means of the restart read gate signal equivalent to the reference read gate signal. When data is continuously reproduced from a next data sector adjacent to the previous data sector, the restart read gate signal is switched ON ahead by a specified period of the reference read gate signal. Therefore, reproduction processing including searching of a synch byte area and the like necessary for data reproducing from the next data sector is surely executed by means of the restart read gate signal. As a result, it is possible to reproduce accurate data by surely detecting the synch byte area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing main parts of a data reproducing device of HDD of a first embodiment of the invention;

FIG. 2 is a block diagram showing a structure of a restart RG generation circuit of the first embodiment;

FIG. 5 is a view illustrating a modification of the invention;

FIG. 6 is a block diagram showing main parts of a data reproducing device of HDD of a second embodiment;

FIG. 14 is a block diagram showing a structure of a restart RG generation circuit of the fourth embodiment;

FIG. 17 is a block diagram showing main parts of a data reproducing device of HDD of the fifth embodiment;

FIGS. 20A to 20F are timing charts illustrating an operation of the conventional data reproducing device;

FIGS. 21A to 21C are timing charts illustrating an operation of the conventional data reproducing device;

FIGS. 22A to 22F are timing charts illustrating an operation of the conventional data reproducing device; and FIGS. 23A to 23C are timing charts illustrating an operation of the conventional data reproducing device.

DETAILED DESCRIPTION OF THE PREFERRED EMBODIMENTS

Figure 3:
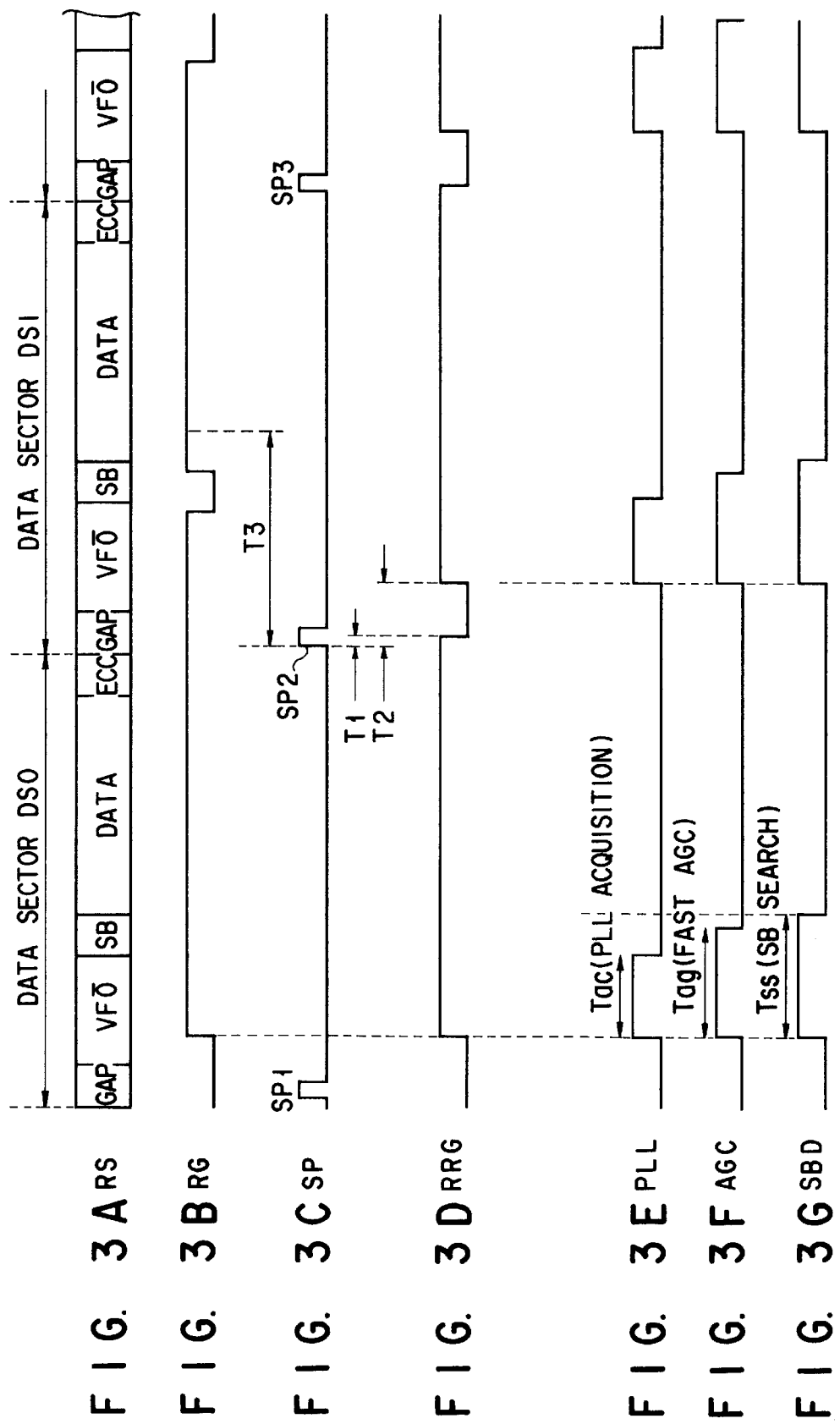
FIGS. 3A to 3G are timing charts illustrating an operation of the device of the first embodiment.

Now, explanation will be made of the preferred embodiments of the invention by referring to the accompanying drawings.

Structure of Data Reproducing Device

A data reproducing device of the invention is applied to HDD and is, as shown in FIG. 1, provided with a read channel 201 of a PRML system. The read channel 201 includes such elements as a restart RG generation circuit 15, a clock controller 14 and the like and performs reproduction processing of a read signal RS output from a head amplifier 1 so as to reproduce recorded data (NRZ data). Usually, the read channel 201 is an integrated circuit of one chip.

In the HDD, a head 101 reads recorded data from a disk 100, converts this into an analog read signal and outputs this to the head amplifier 101. The head amplifier 1 amplifies a read signal RS from the head 101 and outputs this to the read channel 201. A HDC 2 generates a read gate (called a reference read gate) RG for determining a timing for starting data reproduction processing and outputs this to the read channel 201.

Further, the HDD is provided with a sector signal generator 16a for generating a sector signal (pulse signal) SP for detecting lead portions of data sectors DS0 and DS1. The sector signal generator 16a is an element included in a main controller (see FIG. 8) composed of a gate array logic circuit and a CPU. The main controller also includes a function of a servo controller for controlling a position of the head 101. The HDC 2 switches the read gate RG ON in synchronization with inputting of a sector pulse SP at the time of starting data reproducing processing.

The read channel 201 is provided with a VGA 3, a LPF 4, a A/D converter 5, a PR equalizer 6, a synch byte detection circuit 7, a AGC 8, a viterbi decoder 9 and NRZ decoder 10a. The VGA 3 amplifies an amplitude of a read signal RS output from the head amplifier 1 by means of a gain controlled by the AGC 8 and holds a level thereof constant. According to the invention, the AGC 8 starts operating in synchronization with a restart read gate RRG (described later) output from the restart RG generation circuit 15. The AGC 8 detects a difference in amplitude among tracks on a disk based on data output from the PR equalizer 6 and controls a gain of the VGA 3 so as to eliminate this amplitude difference. The LPF 4 is a low-pass filter for eliminating high-pass noises from a read signal RS. The A/D converter 5 is, for instance a flash type (parallel type) and converts an analog read signal RS into digital data.

The PR equalizer 6 and the viterbi decoder 9 are circuit elements necessary for signal reproduction processing of the PRML system. The PR equalizer 6 is provided with a digital filter (FIR filter) for equalizing a PR (Partial Response) characteristic of digital data into which the read signal RS is converted by means of the A/D converter 5. The viterbi decoder 9 is a ML (Maximum likelihood) estimation decoding circuit for detecting a most reliable data string (most certain string) from digital data (code data strings) PR-equalized based on a viterbi algorithm.

The synch byte detecting circuit 7 searches a synch byte area (SB) of each data sector constituting a sector format and outputs a detected signal SBD thereof to the HDC 2. The NRZ decoder 10a is a recording decoder for decoding the data string output from the viterbi decoder 9 to a code of the recorded data (usually NRZ code) and outputs this as reproduced data (NRZ data).

A read PLL 12 (VFO circuit) executes, by means of a clock switching circuit 13, phase acquisition by using a synchronous pattern (output from the PR equalizer 6) of a VFO area (PLL synch area) or a write clock pulse WC from a write clock generation circuit 11 (time Tac in FIG. 3E). The clock switching circuit 13 changes, when the restart read gate RRG is OFF, a switch to an output side of the write clock generation circuit 11 and supplies the write clock pulse WC to the read PLL 12.

The clock controller 14 switches, immediately after the restart read gate RRG is switched from OFF to ON (T4 and T5 in FIG. 4D), switches from a read clock RC from the read PLL 12 to the write clock (pulse) WC and supplies this to the viterbi decoder 9 and the NRZ decoder 10a. T4 and T5 include the phase acquisition time Tac of the read PLL 12.

Structure of Restart RG Generation Circuit

The restart RG generation circuit 15 is, when a reference read gate RG from the HDC 2 is used as an external read gate, for generating a restart read gate RRG equivalent to an internal read gate of the read channel 201. The restart RG generation circuit 15 is, as shown in FIG. 2, provided with a write clock counter 21, a register 22, a RG detection circuit 23 and a gate pulse generation circuit 24. The write clock counter 21 starts a counting operation in synchronization with the sector signal SP from the sector signal generator 16a and counts the write clock WC from the write clock generation circuit 11.

In the register 22, time data T1 to T3 are preset for determining the counting number of times of the write clock counter 21. These time data T1 to T3 are, as shown in FIG. 3C, data corresponding to time T1 to T3 for determining timings for switching the read gate RRG OFF and ON from the time of generation of a sector signal SP (pulse SP 2). The write clock counter 21 outputs a gate stop signal GSO for switching the read gate RRG OFF when counting reaches the time data T1 and outputs a gate start signal GSA for switching the read gate RRG ON when counting reaches the time data T2. Also, when counting reaches the time data T3, the write clock counter 21 outputs a detected signal SD of a continuous sector reproducing mode (described later) to the RG detection circuit 23.

The RG detection circuit 23 latches an ON state of the reference read gate RG output from the HDC 2 in synchronization with the sector signal SP and resets latching in synchronization with inputting of the detected signal SD. The gate pulse generation circuit 24 outputs a read gate RRG corresponding to a gate control signal GSA or GSO from the write clock counter 21 by means of a detected signal RD of a logical level "H" when the RG detection circuit 23 is in a latching state or the reference read gate RG in an ON state (see FIG. 3).

Next, explanation will be made of an operation of the device of the invention.

Data Reproduction Processing by Restart Read Gate RRG

In a data reproducing operation, first the head 101 is positioned in a target track TR of the disk 100 and recorded data is read from a data sector to be accessed. A read signal RS read from the head 101 is amplified by means of the head amplifier 1 and input to the read channel 201. A format of the read signal RS is, as shown in FIG. 3, in accordance with a format structure of each data sector.

Here, according to the invention, a format structure of a CDR system is assumed. That is, the number of data sectors included in each track TR is different from zone to zone. For each track TR, positions of servo areas (SA0 and SA1) are the same but arrangement of the data sectors is different depending on the number of sectors. For instance, as shown in FIG. 3, two data sectors are continuously disposed between the servo areas. There may also be a case where a data sector is disposed in a separated state with a certain servo area therebetween (described later).

The HDC 2 generates a reference read gate RG for determining a timing for starting reproduction processing of the read channel 201 and outputs this. The sector signal generator 16a outputs a sector signal SP for detecting a leading portion of each data sector. The sector signal generator 16a generates a sector signal SP for instructing of a leading portion of each data sector based on a servo sector signal read from the servo area by means of the head 101. This sector signal SP is usually generated before the reference read gate RG or the restart read gate RRG provided by the invention is switched ON.

In the read channel 201 of the invention, based on the reference read gate RG and the sector signal SP, a timing for starting the reproduction processing is determined by the restart read gate RRG generated by means of the restart RG generation circuit 15. The restart RG generation circuit 15 switches, as shown in FIG. 3D, the restart read gate RRG ON in synchronization with the reference read gate RG during an initial period of data reproduction processing in which a data sector immediately before is not read. That is, according to the invention, in a continuous sector reproducing mode for executing continuous data reproduction processing from adjacent data sectors, the restart read gate RRG according to an operation of the write clock counter 21 is generated.

The continuous sector reproducing mode is determined by a polarity of the reference read gate RG at the time of inputting the sector signal SP. That is, if this is ON, this means the continuous sector reproduction mode while if this is OFF, this means an initial period of the data reproduction processing. More specifically, the RG detection circuit 23 outputs, when latching an ON state of the reference read gate RG, a detected signal RD of a logical level "H" to the gate pulse generation circuit 24 in synchronization with inputting of the sector signal SP. The gate pulse generation circuit 24 outputs a restart read gate RRG of the same level as the reference read gate RG when the detected signal is a logical level "L".

As shown in FIG. 3C, when a sector pulse SP 2 next to a first sector pulse SP 1 is generated, the reference read gate RG is ON. Thus, the restart RG generation circuit 15 generates, determining the continuous sector reproduction mode, a restart read gate RRG according to an operation of the write clock counter 21. That is, the restart RG generation circuit 15 switches the restart read gate RRG OFF by means of a gate stop signal GSO shown in FIG. 2 after a passage of time T1 from a generation of the sector pulse SP 2. At this time, as shown in FIG. 3A, the HDC 2 keeps the reference read gate RG ON because reading of ECC data from the previous data sector DS0 is not finished yet. The reference read gate RG is switched OFF near an input time of a VFO area of a next data sector DS1 or a synch byte area after reading of the ECC data is finished (see FIG. 3B).

The restart RG generation circuit 15 switches the restart read gate RRG ON again by means of a gate start signal GSA shown in FIG. 2 after a passage of time T2 from a generation of the sector pulse SP 2. At this time, if this is not switched ON again within a period T3 after the reference read gate RG is switched OFF, this means that the continuous sector reproducing mode is not realized. Therefore, the restart RG generation circuit 15 switches the restart read gate RRG OFF so as to reset a latched state of the RG detection circuit 23 by means of a detected signal SD output after a passage of time T3 and cause this to the same level as the reference read gate RG.

As described above, at the time of the continuous sector reproducing mode, the restart read gate RRG is switched ON again before the reference read gate RG is switched ON by means of the preset time data T1 to T3. Conventionally, in particular because of circuit delaying of the decoder circuits 9 and 10a in the read channel of the PRML system, it has taken a long time until reading of the ECC data by the HDC 2 is finished and thus a timing for switching the reference read gate RG ON again has been delayed because reproducing processing for the next data sector is continuously performed. For this reason, searching of a synch byte area (SB) by the synch byte detection circuit 7 cannot be performed and a synch byte error may be produced.

Figure 4:
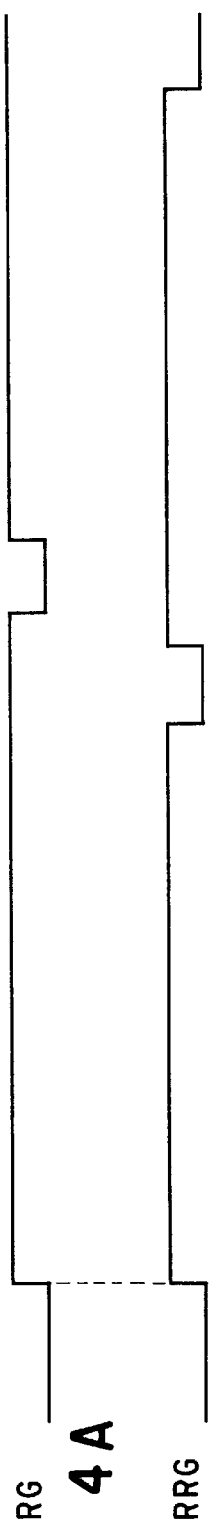
FIGS. 4A to 4E are timing charts illustrating an operation of the device of the first embodiment.

On the other hand, according to the invention, by means of the restart read gate RRG to be switched ON again ahead of the reference read gate, the read PLL, the AGC 8 and the synch byte detection circuit 7 are also started again ahead thereof. This makes it possible to surely execute searching processing of the synch byte are (SB) necessary for performing continuous reproduction processing for the next data sector at the time of the continuous sector reproducing mode. Therefore, as shown in FIG. 4C, it is possible to continuously reproduce accurate NRZ data without generating data errors and output these to the HDC 2.

Operation of Clock Controller 14

According to the invention, during a phase acquisition period (phase synchronizing period) Tac of the read PLL 12 immediately after the restart read gate RRG is switched from OFF to ON, a write clock WC is supplied to the viterbi decoder 9 and the NRZ decoder 10a by means of the clock controller 14. That is, as shown in FIG. 4D, during the period (T4 and T5) immediately after the restart read gate RRG is switched from OFF to ON, a read clock RC from the read PLL 12 is switched to a read clock RRC equivalent to the write clock WC and this is supplied to the viterbi decoder 9 and the NRZ decoder 10a (WPLL). This period T4 and T5 is a time obtained by adding the OFF time of the restart read gate RRG and the phase acquisition time Tac of the read PLL 12.

After a passage of the period T4 and T5, a read clock RC from the PLL 12 is supplied to the viterbi decoder 9 and the NRZ decoder 10a as a read clock RRC (RPLL). Therefore, during the phase acquisition period Tac, an influence of an unstable operation of the read PLL 12 can be prevented from being exerted on operations of the viterbi decoder 9 and the NRZ decoder 10a. After the phase acquisition period Tac of the read PLL 12 is finished and locked, a stable read clock RC is supplied from the read PLL 12.

Modification

FIG. 5 shows a structure of the read channel 201 in which the clock controller 14 is not used. That is, the write clock WC from the write clock generator 11 is supplied to the viterbi decoder 9 and the NRZ decoder 10a.

Second Embodiment of the Invention

According to the invention, other than the system of generating a restart read gate RRG inside the read channel 201 by means of the restart RG generating circuit 15, a system of generating a restart read gate RRG by means of software of the HDC 2 may be employed.

Figure 7:
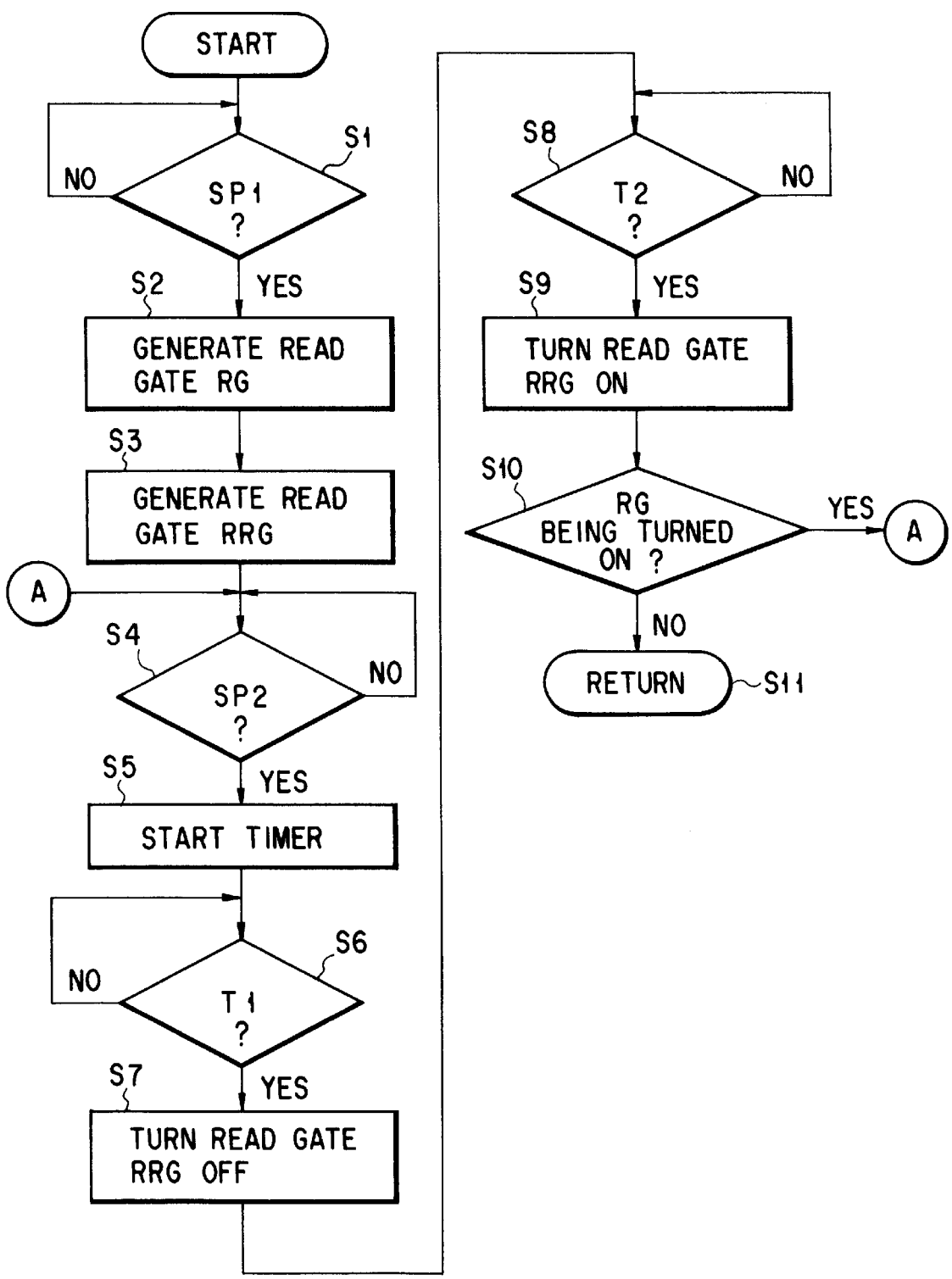
FIG. 7 is a flow chart illustrating an operation of the device of the second embodiment.

As shown in FIG. 6, the HDC 2 generates a restart read gate RRG and supplies this to the read channel 201. The read channel 201 is provided with each element shown in FIG. 1 except the restart RG generating circuit 15. The HDC 2 executes, as shown by a flow chart in FIG. 7, generation processing of a restart read gate RRG.

That is, the HDC 2 outputs a reference read gate RG after a first sector pulse SP 1 is input from the sector signal generator 16a thereto (step S1 and S2). Here, since the continuous sector reproducing mode is not realized when the sector pulse SP 1 is generated, the restart read gate RRG is switched ON in synchronization with the reference read gate RG (step S3). Then, when a sector pulse SP 2 is input, a passage of time by the above-described time data T1 to T3 is measured by starting a timer. That is, after a passage of the time T1, the restart read gate RRG is switched OFF (step S6 and S7). Further, after a passage of the time T2, the restart read gate RRG is switched ON (step S8 and S9). These are processings shown by timing charts in FIGS. 3C and 3D.

Here, if the reference read gate RG is not switched ON within the time T3, this means that the continuous sector reproducing mode has not been realized (NO in step S10). Thus, the HDC 2 switches the ON switched restart read gate RRG OFF and processing returns to one at the initial time (step S11). On the other hand, as shown in FIG. 3C, when the reference read gate RG is ON and the continuous sector reproducing mode has been realized, the ON state of the restart read gate RRG is maintained and this is placed under standby for inputting of a next sector pulse SP 3 (YES in step S10, S4).

In the system for generating the restart read gate RRG by means of the HDC 2, a function different from the conventional device must be added thereto. However, since the restart RG generation circuit 15 can be omitted from the read channel 201, the circuit structure of the read channel 201 can be made simple.

Figure 8:
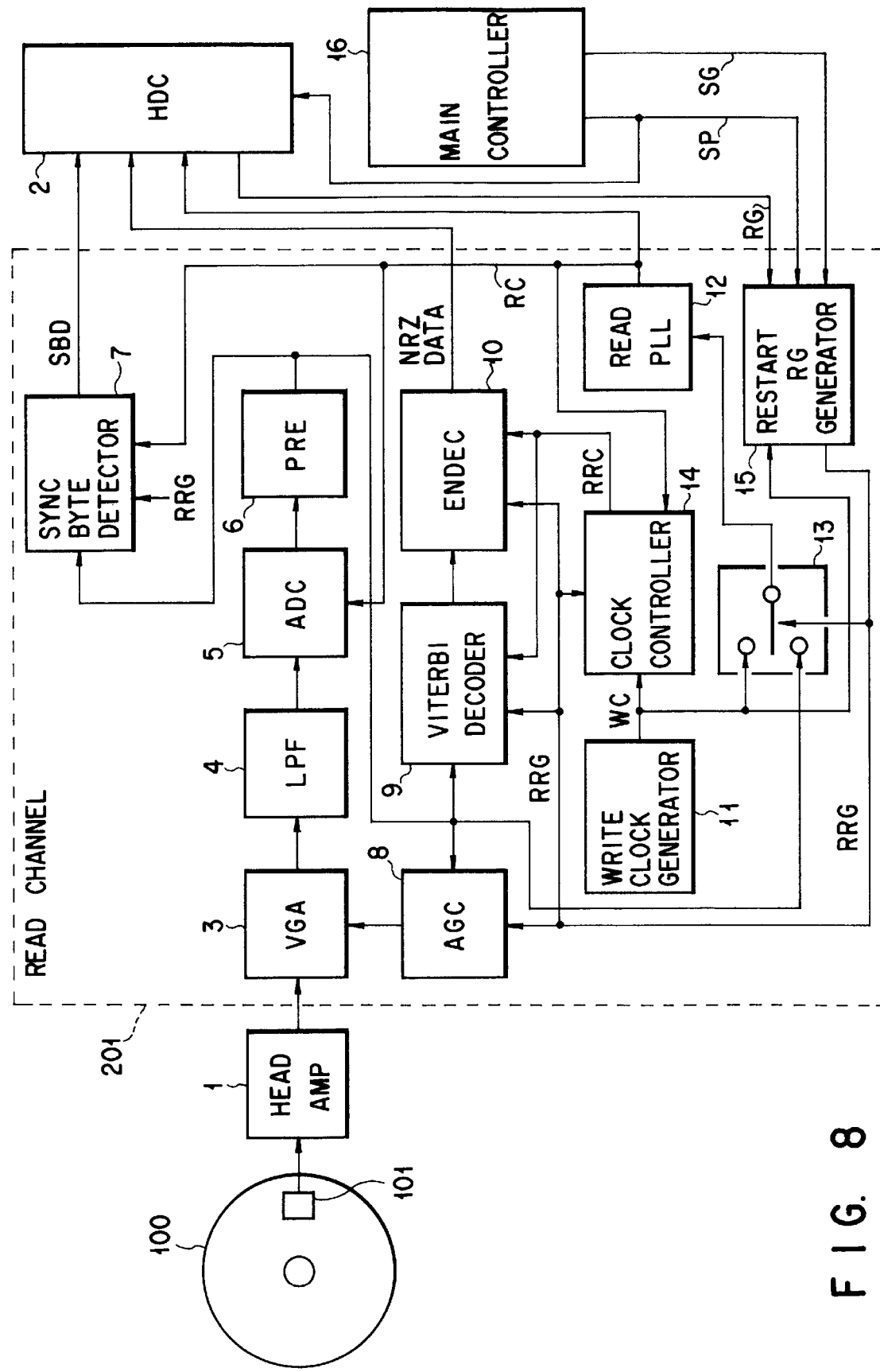
FIG. 8 is a block diagram showing main parts of a data reproducing device of HDD of a third embodiment.
Figure 9:
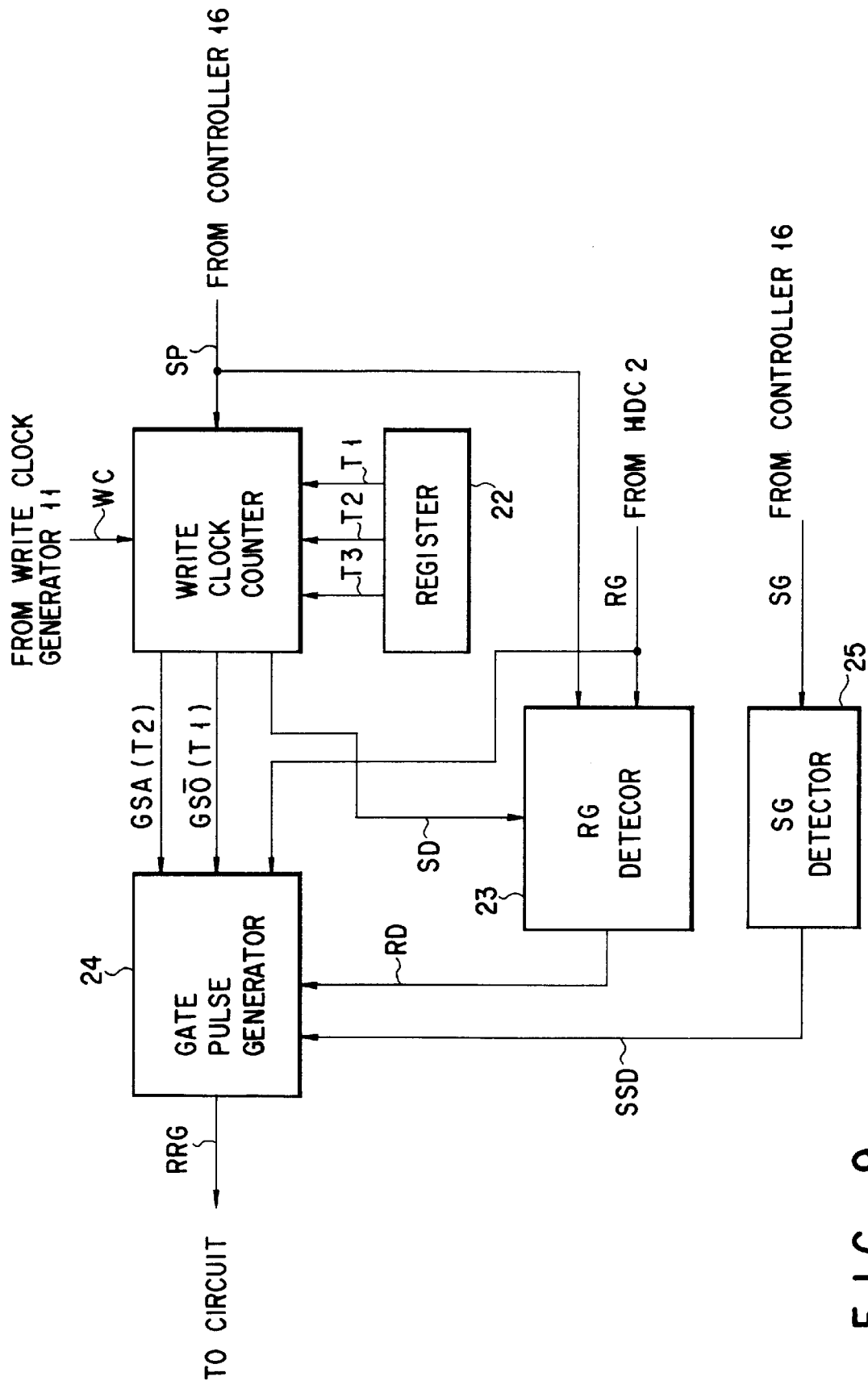
FIG. 9 is a block diagram showing a structure of a restart RG generation circuit of the third embodiment.

Method for Generating Restart Read Gate RRG in Sector Format Including Data Split FIGS. 8 and 9 are block diagrams of a third embodiment of the invention.

As described above, as a disk sector format of the CDR system, there is available one employing a data split in which servo areas are disposed on the middle way of the data sectors. In other words, this is a format in which a certain data sector is split sandwiching the servo area in a case where a plurality of data sectors are arrayed among the servo areas. More specifically, as shown in FIG. 10A, this is a format in which in a certain data sector a servo are SA is disposed in a Na byte of a data area (DATA) and remaining Nb byte of the data area is split.

Figure 10:
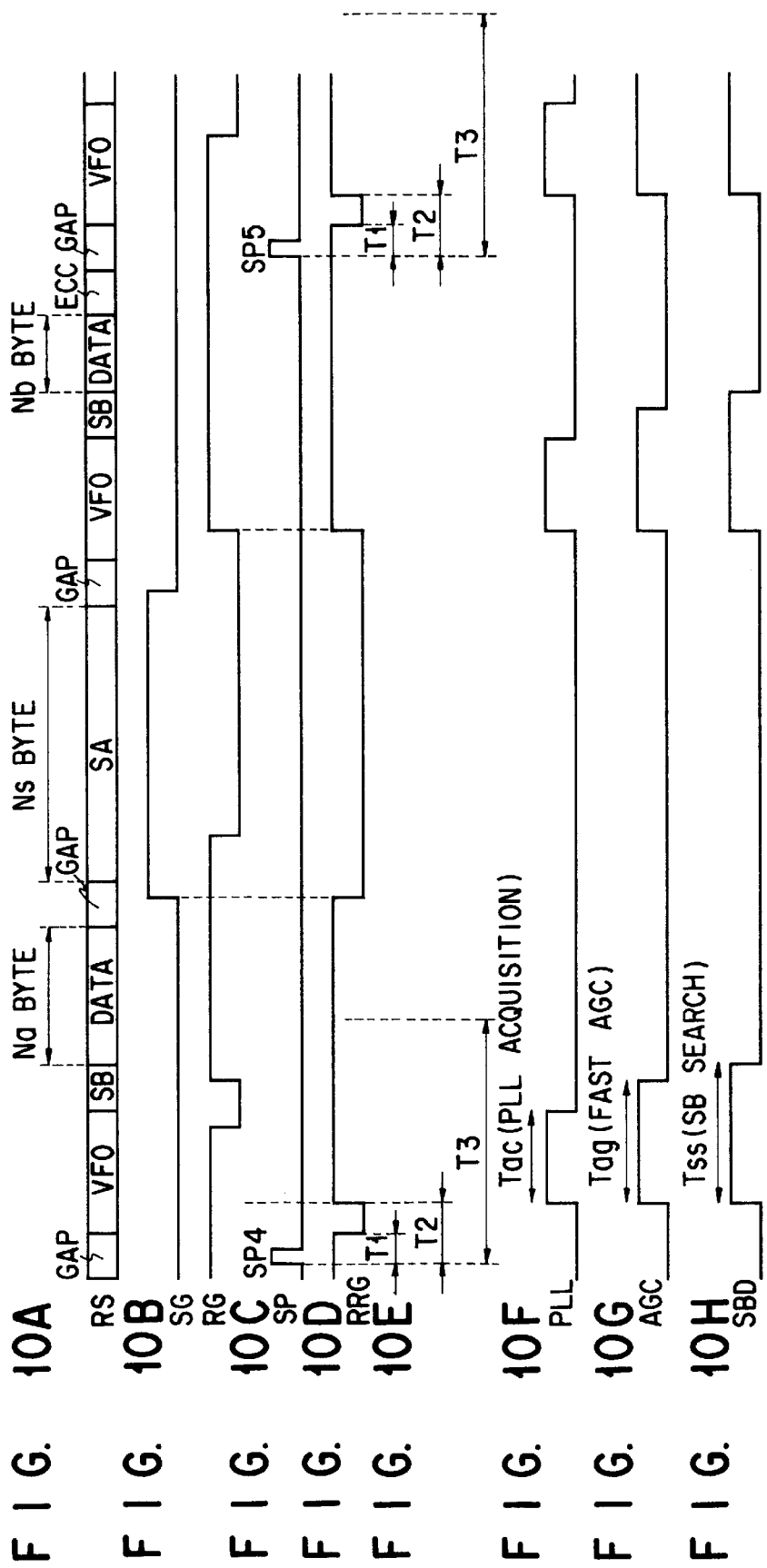
FIGS. 10A to 10H are timing charts illustrating an operation of the device of the third embodiment.

In the case of such a data split format, as shown in FIG. 10B, the restart RG generation circuit 15 clears (switches OFF) the ON state restart read gate RRG in synchronization with starting of a servo gate SG.

The servo gate SG is a control signal used as an enabling signal for processing of the servo data read from the servo area SA by means of the head 101 and generated by means of a main controller 16 (see FIG. 8). The main controller 16 is composed of a gate array logic circuit and a CPU and includes a function of a servo controller for controlling positioning of the sector signal generator 16a and the head 101. That is, processing of the servo data means position-controlling for positioning the head 101 in a center of a target track.

The restart RG generation circuit 15 is, as shown in FIG. 9, provided with a SG detector 25 for detecting starting of the servo gate SG and outputting a detected signal SSD thereof. The gate pulse generation circuit 24 switches, as described above, when the detected signal SSD is input from the detector 25, the ON state restart read gate RRG OFF. Furthermore, as shown in FIG. 10C, at the time of restarting in a next VFO area, the HDC 2 switches the reference read gate RG ON for reproducing the split data are (Nb byte). The gate pulse generation circuit 24 switches the restart read gate RRG ON again with a timing of the reference read gate RG (see FIG. 10E). Other operations are the same as shown in FIGS. 1 and 2.

To sum up, according to the third embodiment, when data reproduction processing is performed by generating the read gate RRG within the read channel 201, controlling is made to switch the read gate RRG OFF by utilizing the servo gate SG with respect to the data split data sector. In other words, the detected signal SSD is output by using the servo gate SG for detecting processing of the data split. Thus, when there is data split in a data sector next to the adjacent data sectors at the time of the continuous reproducing mode, the read gate RRG which has been switched ON is switched OFF according to the servo gate SG. During the ON period of this read gate RRG, reproducing processing of data (Na byte) in a first half of the data split is executed. Then, after the processing of the servo data is finished, by switching the read gate RRG ON in synchronization with the reference read gate RG which has been switched ON again, reproduction processing of data (Nb byte) in a second half of the data split is executed.

Figure 13:
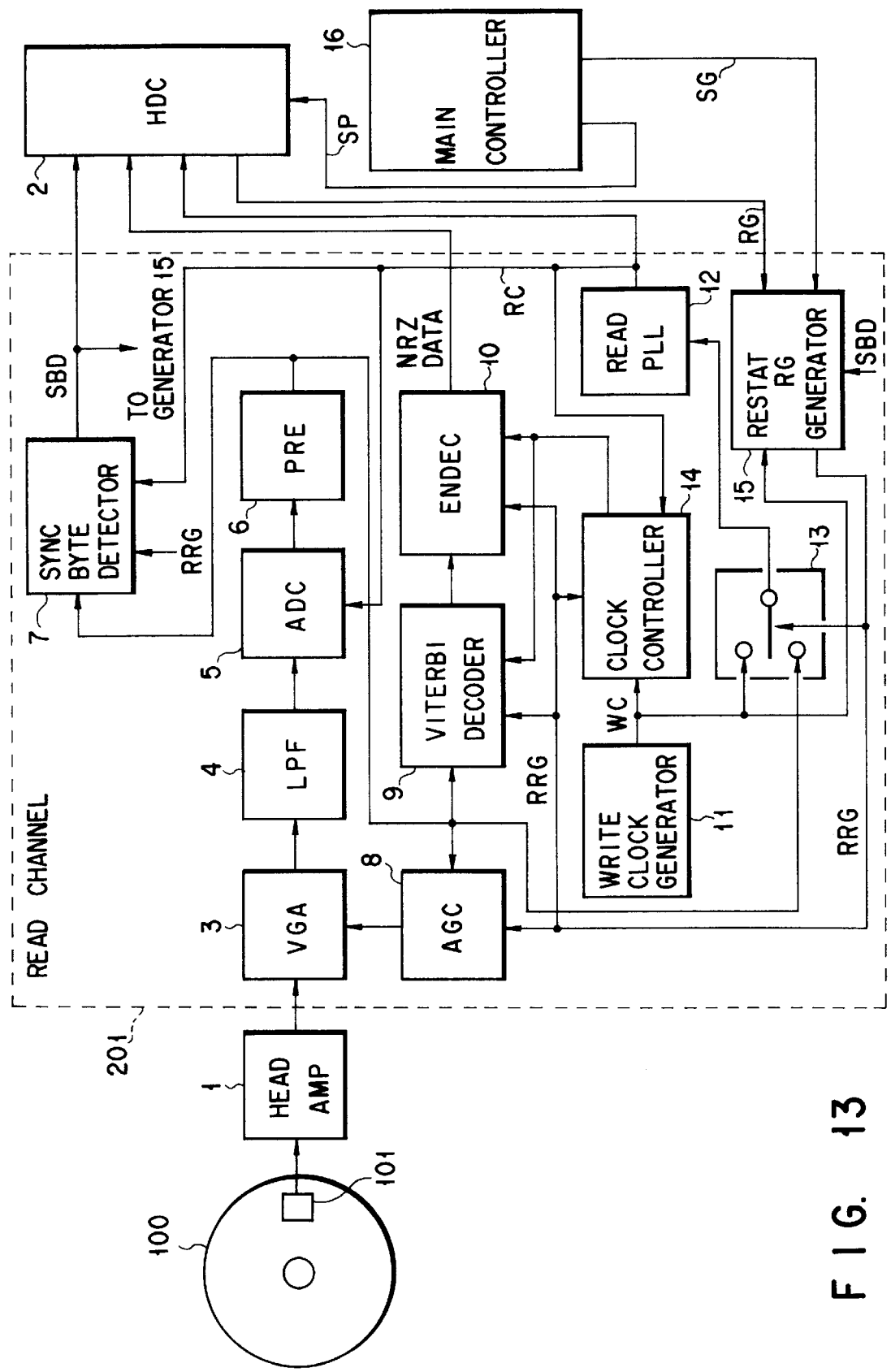
FIG. 13 is a block diagram showing main parts of a data reproducing device of HDD of the fourth embodiment.

Method for Generating Restart Read Gate RRG By Means of Synch Byte Detected Signal SBD FIGS. 13 and 14 are block diagrams of a fourth embodiment of the invention.

In the first and third embodiments, the restart RG generation circuit 15 uses the sector signal SP supplied from the HDC 2 as a counter start signal of the write clock counter 21 (see FIGS. 2 and 9). In the fourth embodiment, as shown in FIGS. 13 and 14, a system is employed, in which a synch byte detected signal SBD from a synch byte detector 7 is used as a counter start signal of a write clock counter 21. By means of this system, a structure for inputting a sector signal SP to a read channel 201 is made unnecessary and it is possible to start a restart RG generation circuit 15 inside the reach channel 201.

Figure 11:
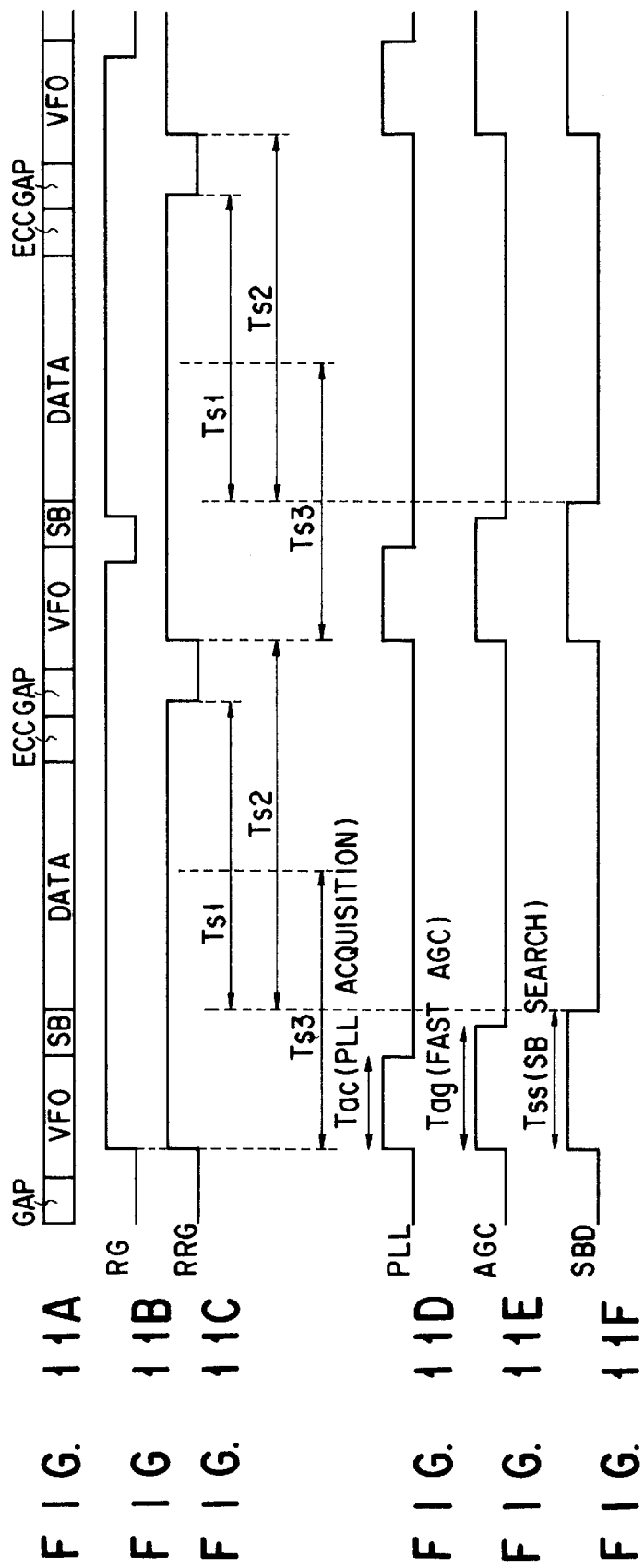
FIGS. 11A to 11F are timing charts illustrating an operation of a device of a fourth embodiment.

As shown in FIG. 14, the restart RG generation circuit 15 is constructed in such a manner that a write clock WC, a synch byte detected signal SBD, a reference read gate RG and a servo gate SG are input to the write clock counter 21. As shown in FIGS. 11B and 11C, the restart read gate RRG is switched ON in synchronization with the reference read gate RG from a HDC 2.

The write clock counter 21 performs counting in synchronization with falling of the synch byte detected signal SBD and outputs a gate stop signal GSO after a passage of time Ts1 set in a register 22. Thus, a gate pulse generation circuit 24 switches the restart read gate RRG OFF. Further, the write clock counter 21 outputs a gate start signal GSA after a passage of time Ts2 set in the register 22. Then, the gate pulse generation circuit 24 switches the restart read gate RRG ON.

Here, determination of a continuous sector reproducing mode is made based on an ON/OFF state of the reference read gate RG during a period of count time Ts3. At this time, the write clock counter 21 starts counting up to the time Ts3 in synchronization with switching ON of the restart read gate RRG. Therefore, for determination processing of the continuous sector reproducing mode the synch byte detected signal SBD is not necessary. If the reference read gate RG is ON after a passage of the time Ts3, the continuous sector reproducing mode is determined and the gate pulse generation circuit 24 maintains the ON state of the restart read gate RRG.

Figure 12:
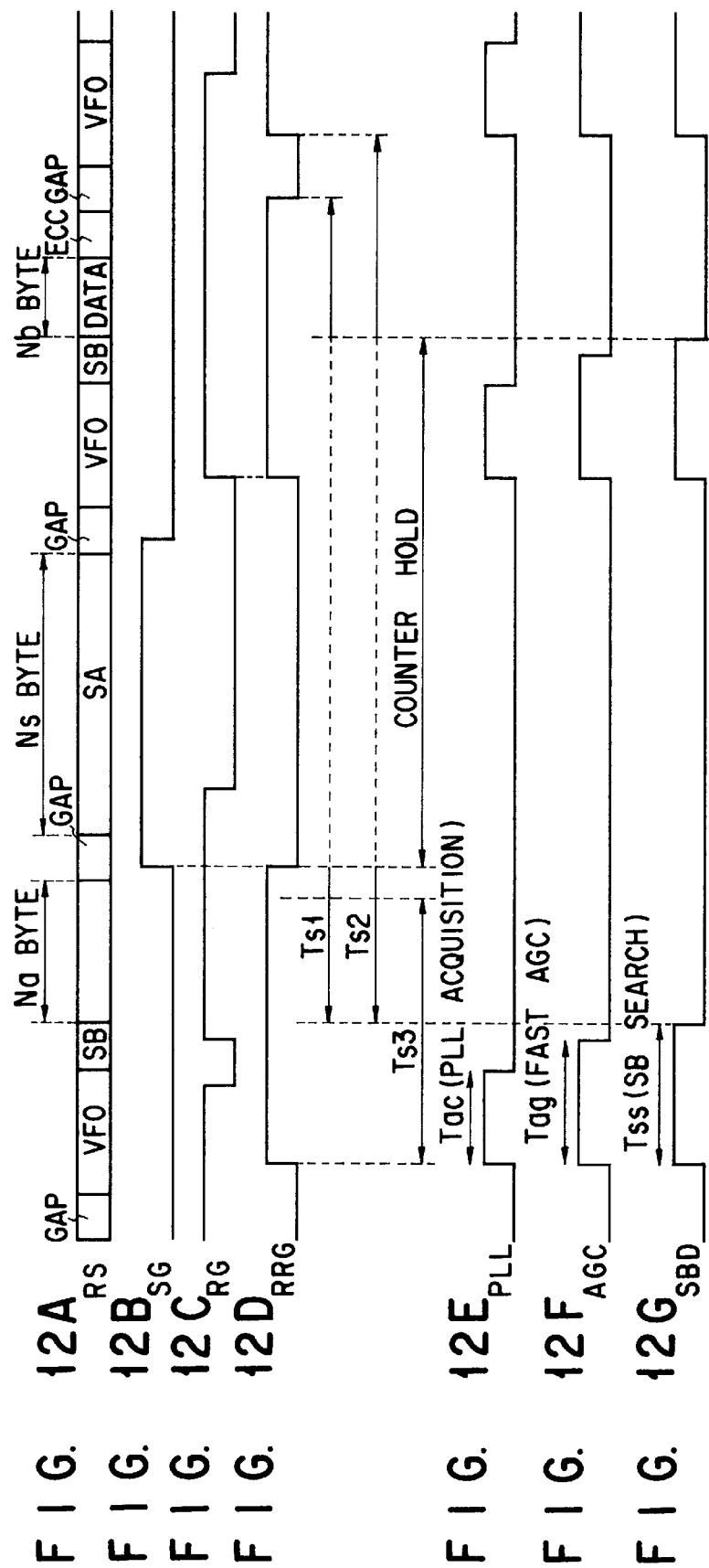
FIGS. 12A to 12G are timing charts illustrating an operation of the device of the fourth embodiment.

In such a system, as shown in FIG. 12A, in a format of a data split in which a servo area SA is disposed in a Na byte of a data sector, the write clock counter 21 switches its counting operation OFF even before a passage of the time Ts1 in accordance with inputting of the servo gate SG. At this time, a counter value is held (counter hold period). Then, in synchronization with the reference read gate RG, the write clock counter 21 is started again, the ON state of the restart read gate RRG is maintained until the counter value Ts1 and switched OFF. A gate start signal GSA is output after a passage of the time Ts2 and the restart read gate RRG is switched ON for reproduction processing of a next data sector.

Method for Generating Restart Read Gate RRG By Means of HDC

FIG. 17 is a block diagram of a fifth embodiment of the invention.

In the fifth embodiment, a read clock RC counter and a byte counter (which counts NRZ data in units of bytes) are used to generate a restart read gate RRG. Further, the restart read gate RRG is turned off when the HDC 2 detects the sync byte area (NRZ data) output from the read channel.

Usually, the HDC 2 holds format information of a CDR system on a disk 100 and defect information as table information beforehand in a buffer memory. The format information includes information on arrangement of data sectors in each zone (including data split position information). The defect information is on a position of a detect data sector and a data sector replacing this.

The HDC 2 recognizes the above-described continuous reproducing operation mode before execution of data reproduction processing in order to process a command for continuously processing reproduction of specified continuous data sectors during a data reproducing operation based on the table information.

Continuous Reproduction Operation Mode Without Data Split

Figure 18A:
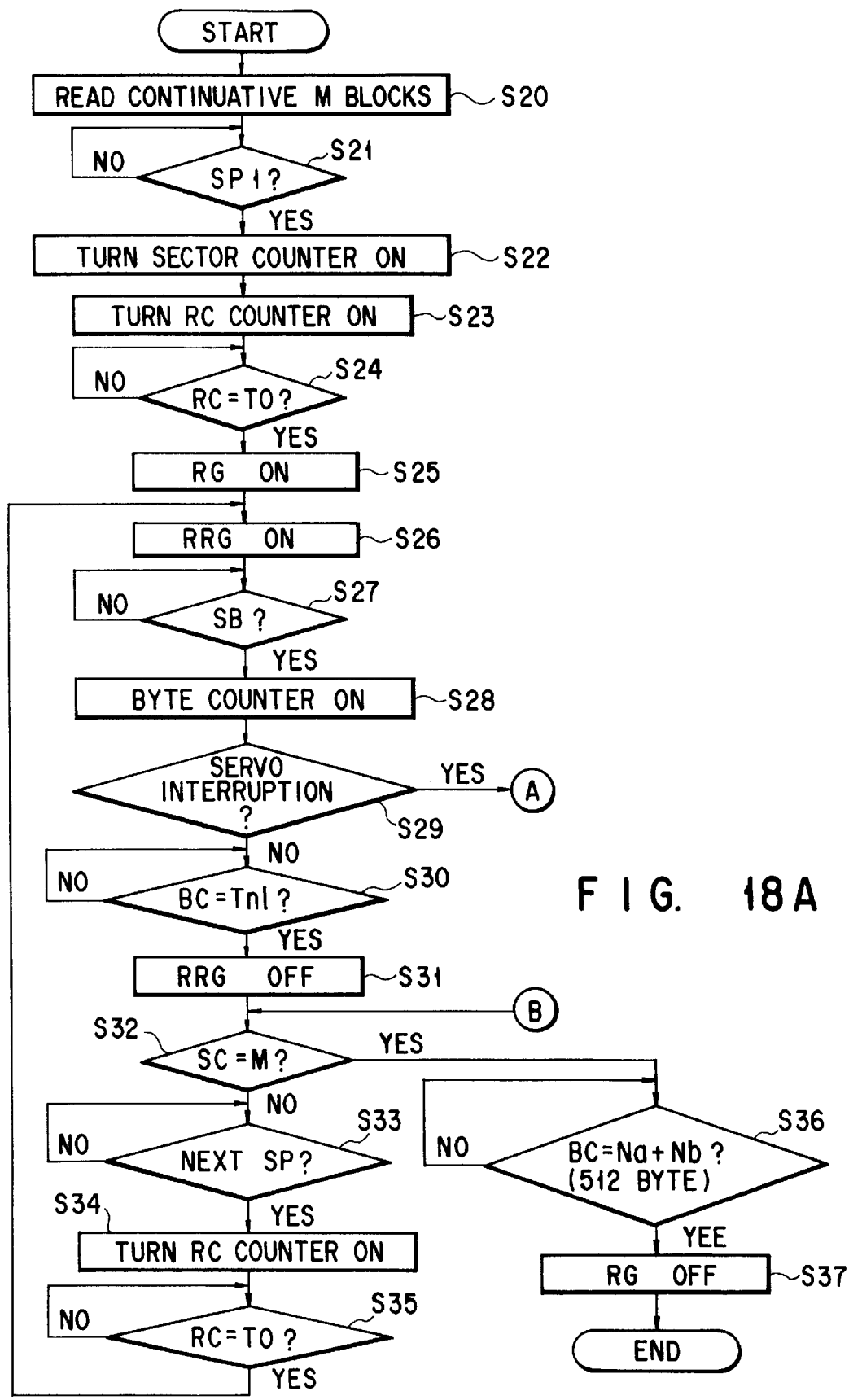
FIGS. 18A and 18B are flow charts illustrating an operation of the device of the fifth embodiment.

Explanation will be made of an operation during reproduction processing of continuous data sectors (FIG. 15A) without any data splits in the continuous reproducing operation mode by referring to a flow chart in FIG. 18A.

Figure 15:
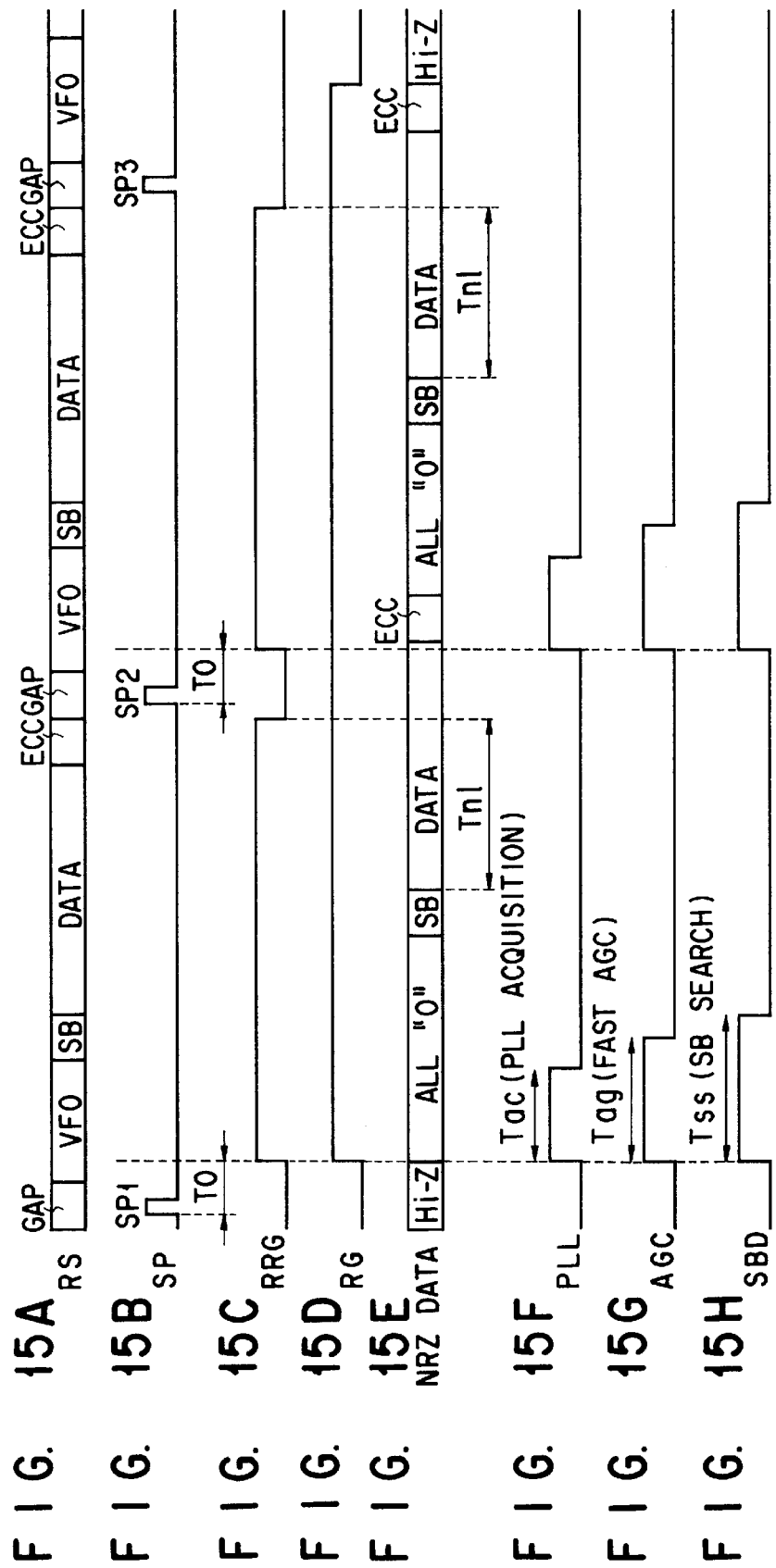
FIGS. 15A to 15H are timing charts illustrating an operation of a device of a fifth embodiment.

First, the HDC 2 starts a sector counter (SC) incorporated therein in synchronization with inputting of a first sector signal SP1 (step S21 and S22). Here, it is assumed that as the number of continuous M blocks (sector) to be reproduction-processed two data sectors are continuously reproduced (M=2 in step S20). The HDC 2 starts a read clock counter (RC counter) at the same time it starts the sector counter (SC) (step S23). When counting of a read clock RC by the RC counter reaches time T0, the HDC 2 switches, as shown in FIGS. 15B to 15D, the reference read gate RG and the restart read gate RRG ON (step S24 to S26).

When a sync byte detection circuit 7 detects a sync byte area SB, the HDC 2 activates the byte counter (BC) incorporated in it, thereby detecting the sync byte detected signal SBD (ZRZ code) which follow all "0s" and recognizes the signal SBD as the head of the data. That is, by switching the reference read gate RG and the restart read gate RRG ON, a read signal RS read by means of a head 101 is input to a read channel 201. As shown in FIG. 15H, the synch byte detection circuit 7 searches the synch byte area SB from the read signal RS (digital signal) and outputs the synch byte detected signal SBD.

The read channel adds a predetermined NRZ code SBD to the head of the data immediately following all "0s" and then outputs this data.

Furthermore, as shown in FIG. 17, a ENDEC 10 decodes, in synchronization with the synch byte detected signal SBD, user data (DATA) of the read signal RS to NRZ data and outputs this to the HDC 2. The HDC 2 starts the byte counter (BC) in synchronization with inputting of the NRZ data from the ENDEC 10. Here, since the mode having no data split is assumed, when counting by the byte counter (BC) reaches specified time Tn1 (equivalent to one sector data quantity 512 byte), as shown in FIG. 15E, the HDC 2 switches the restart read gate RRG OFF (step S29 to S31). When a next sector signal SP2 is input so as to continuously reproduce a next data sector, the HDC 2 repeats the above-described processing (step S32 to S35). Here, since only two data sectors are continuously reproduced, the HDC 2 keeps the restart read gate RRG OFF (step S32, S36 and S37).

Continuous Reproducing Operation Mode With Data Split

Figure 18B:
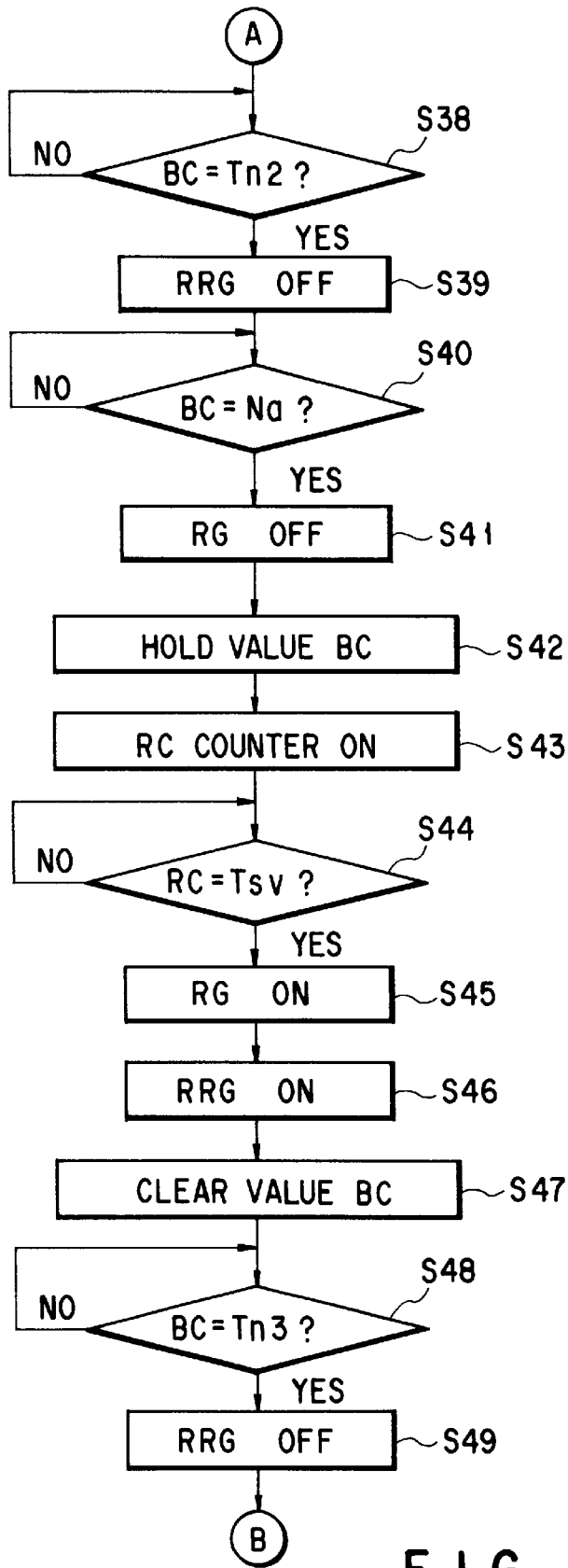
Figure 19:
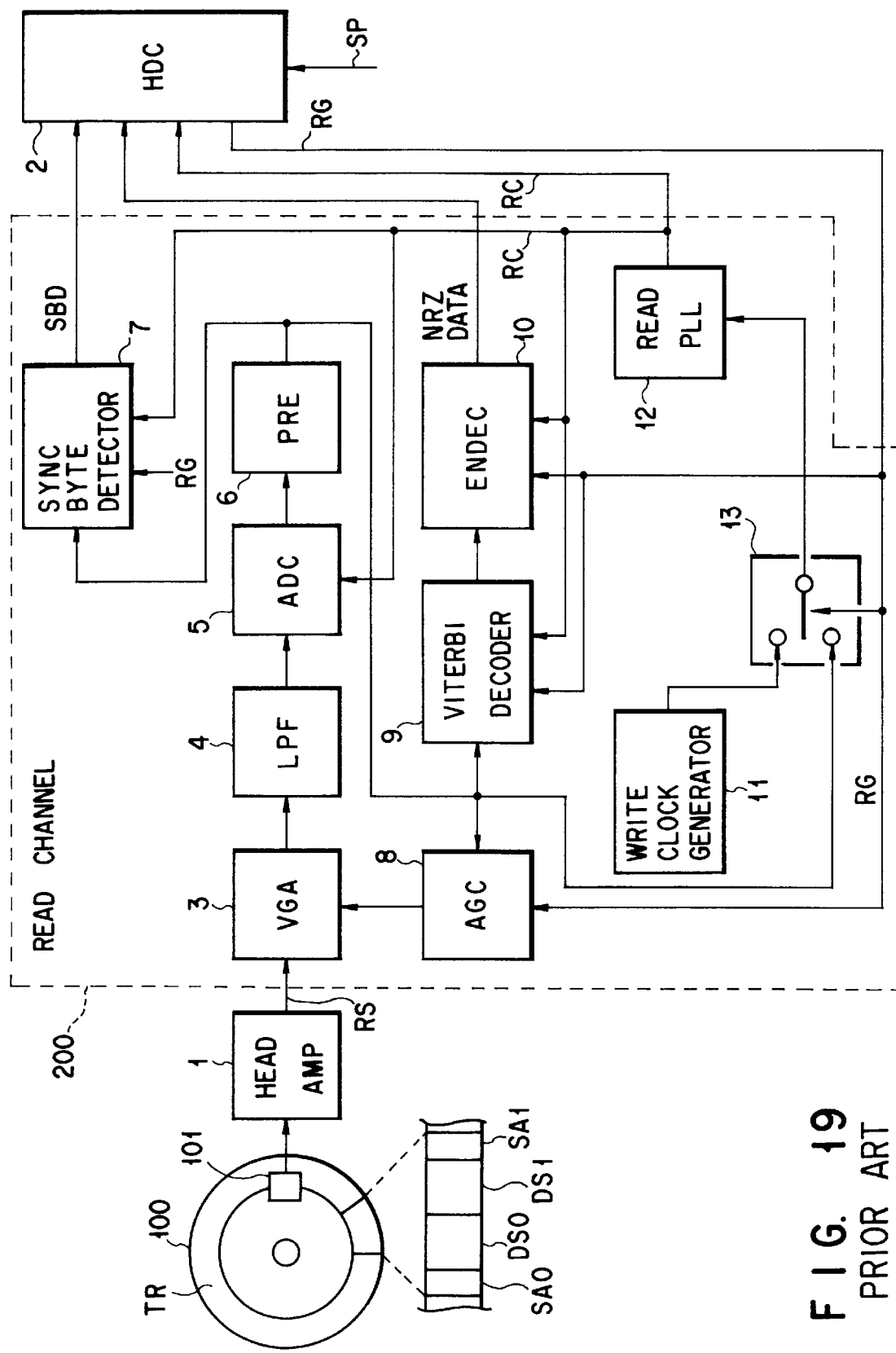
FIG. 19 is a block diagram showing main parts of a conventional data reproducing device.

Next, explanation will be made of an operation during reproduction processing of continuous data sectors with data splits (FIG. 16A) in the continuous reproducing operation mode by referring to a flow chart in FIG. 18B.

Figure 16:
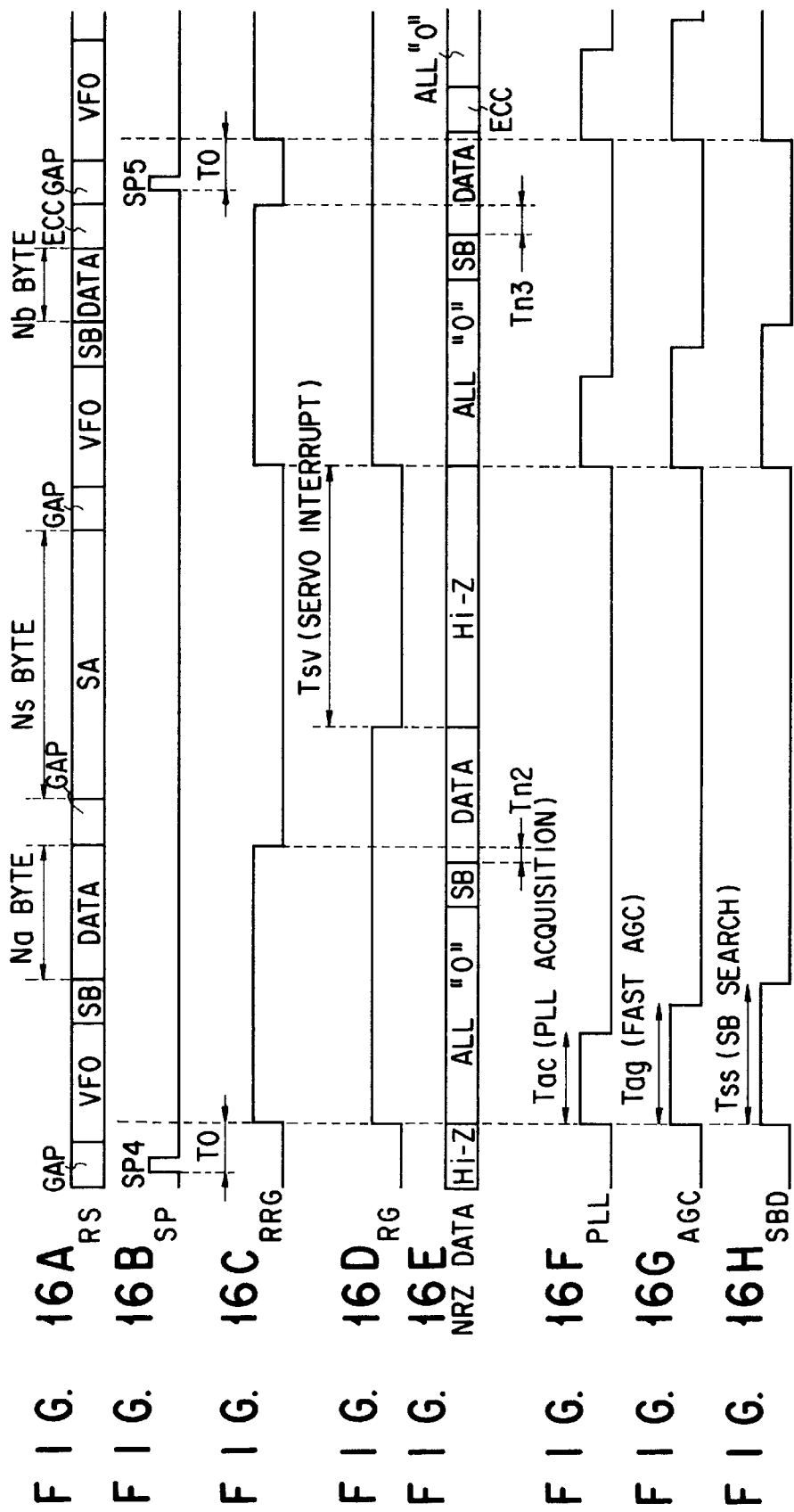
FIGS. 16A to 16H are timing charts illustrating an operation of the device of the fifth embodiment.

The HDC 2 recognizes by means of the table information during the continuous reproducing operation mode, as shown in FIG. 16A, that in the data sectors having continuous sectors a data split exists in which a servo area (SA) is disposed in a Na byte of the data (DATA). Thus, since servo interruption processing is executed when the byte counter (BC) is started in step S28 shown in FIG. 18A, processing moves to that shown by a flow chart in FIG. 18B (YES in step S29).

That is, when counting by the byte counter (BC) reaches specified time Tn2 as shown in FIG. 16E, the HDC 2 switches, as shown in FIG. 16C, the restart read gate OFF (step S38 and S39). The time Tn2 is from when the synch byte area SB is surely detected to immediately after the ENDEC 10 starts decoding the user data (DATA) to the NRZ data.

Then, when counting by the byte counter (BC) reaches time equivalent to a Na byte quantity in a first half data (DATA) of the data sector, the HDC 2 switches the reference read gate RG OFF and holds a counted value of the byte counter (BC) (step S40 to S42). When the RC counter is started and counting thereof reaches time Tsv equivalent to the servo area SA, the HDC 2 switches the reference read gate RG and the restart read gate RRG ON again (step S43 to S46). At the same time, the byte counter (BC) is cleared and then started depending on detection of the synch byte area SB (step S47).

When counting by the byte counter (BC) reaches time Tn3 necessary for reproducing a Nb byte quantity in the latter half data (DATA) of the data sector, the HDC 2 switches the restart read gate RRG OFF (step S48 and S49). Here, if the synch byte area SB is not detected, a synch byte error occurs and thus the HDC 2 switches the reference read gate RG OFF. Therefore, by switching the reference read gate RG OFF, the HDC 2 also switches the restart read gate RRG OFF.

It is clear from the foregoing description of the invention that during the continuous reproducing operation mode for executing continuous reproduction processing of data from the adjacent data sectors, by using the method for generating the restart read gate RRG in addition to the reference read gate RG, it is possible to surely detect the synch byte area (SB) of the next data sector by means of the synch byte detection circuit 7. Therefore, without making the gap area between the data sectors especially large, the synch byte area (SB) can be surely detected and as a result a data reproducing operation can be surely performed. In particular by applying this to the read channel of the PRML system, without reducing a data format efficiency of a disk data reproduction processing for continuous data sectors can be surely performed and this makes it possible to attain a high recording density.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for data reproducing in a disk storage system, the apparatus comprising:

a disk having a plurality of data sectors as recording areas of data access units arrayed in a circumferential direction;

head means for outputting a read signal read from the disk by the data sector unit;

data reproducing means for executing reproduction processing of recorded data recorded in the disk from a read signal output from the head means;

sector signal generating means for generating a sector signal for detecting a lead portion of the data sector;

first read gate means for generating a reference read gate signal for determining a timing of starting reproduction processing of the data reproducing means; and second read gate means for generating a restart read gate signal when recorded data are continuously reproduced from previous and next adjacent data sectors while the data reproducing means is reproducing the data stored in one of the data sectors, the second read gate means generating the restart read gate signal for determining a timing of starting reproducing of the data stored in the next data sector, after the sector signal generating means generates the sector signal corresponding to the next data sector and before the first read gate means generates the reference read gate signal corresponding to the next data sector.

2. The apparatus according to claim 1, wherein the data reproducing means includes read PLL means for generating a synchronous clock necessary for reproducing of the data and decoder means for generating reproduced data, and the second read gate means starts the read PLL means by outputting the restart read gate signal.

3. The apparatus of claim 2, further comprising:

clock control means for controlling supplying of the synchronous clock output from the read PLL means and a preset clock of a fixed period, wherein controlling is performed in such a manner that during a specified period of switching of the restart read gate signal from OFF to ON the clock of a fixed period is supplied to the decoder means as a synchronous clock and after a passage of the specified period the synchronous clock output from the read PLL is supplied to the decoder means.

4. The apparatus according to claim 1, wherein the second read gate means is provided with continuous reproducing mode means for determining a continuous reproducing operation for continuously reproducing recorded data from the adjacent data sectors, the continuous reproducing mode means determining the continuous reproducing operation when the reference read gate signal is switched ON again within a given period after the sector signal generating means generates the sector signal corresponding to the next data sector and after the reference read gate signal is switched OFF.

5. An apparatus for data reproducing in a disk storage system, the apparatus comprising:

a disk having a plurality of data sectors as recording areas of data access units arrayed in a circumferential direction;

head means for outputting a read signal read from the disk by the data sector units;

data reproducing means for executing reproduction processing of recorded data recorded in the disk from a read output from the head means;

first read gate means for generating a reference read gate signal for determining a timing for starting reproduction processing of the data reproducing means; and second read gate means for generating, during reproduction processing of the data reproducing means, when recorded data are continuously reproduced from previous and next adjacent data sectors of the disk, a restart read gate signal for determining a timing for starting reproduction processing before the reference read gate signal corresponding to the next data sector;

clock control means for controlling supplying of the synchronous clock output from the read PLL means and a preset clock of a fixed period, wherein controlling is performed in such a manner that during a specified period of switching of the restart read gate signal from OFF to ON the clock of a fixed period is supplied to the decoder means as a synchronous clock and after a passage of the specified period the synchronous clock output from the read PLL is supplied to the decoder means.

6. An apparatus for data reproducing in a disk storage system, the apparatus comprising:

a disk having a plurality of data sectors as recording areas of data access units arrayed in a circumferential direction;

head means for outputting a read signal read from the disk by the data sector unit;

data reproducing means for executing reproduction processing of recorded data recorded in the disk from a read signal output from the head means;

sector signal generating means for generating a sector signal for detecting a lead portion of the data sector;

disk control means for controlling the data reproducing means, determining data sector for data reproducing in accordance with the sector signal, and signal for determining a timing of starting the data reproducing; and read gate means for generating a restart read gate signal for determining a timing of starting a operation of the data reproducing means in accordance with the sector signal and the reference read gate signal, the read gate means generating the restart read gate signal corresponding to the reference read gate signal when the reference read gate signal is switched OFF after the sector signal generating means generates the sector signal, and generating the restart read gate signal before the reference read gate signal is switched ON again when the reference read gate signal is switched ON after the sector signal generating means generates the sector signal.

7. The apparatus according to claim 6, wherein the read gate means is provided with continuous reproducing mode means for determining a continuous reproducing operation for continuously reproducing recorded data from previous and next adjacent data sectors, the continuous reproducing mode means determining the continuous reproducing operation when the reference read gate signal is switched ON again within a given period (T3) after the sector signal generating means generates the sector signal corresponding to the next data sector and after the reference read gate signal is switched OFF, and the read gate means generating the restart read gate signal corresponding to the next data sector within a given period (T2) after the sector signal generating means generates the sector signal corresponding to the next data sector and before the reference read gate signal is switched On again when the continuous reproducing mode means determines the continuous reproducing operation.

8. An apparatus for data reproducing in a disk storage system, the apparatus comprising:

a disk having a plurality of data sectors as recording areas of data access units arrayed in a circumferential direction;

a transducer head for outputting a read signal read from the disk by the data sector unit;

a read channel for executing reproduction processing of recorded data recorded in the disk from a read signal output from the head means;

a hard disk drive for generating a sector signal for detecting a lead portion of the data sector;

a hard disk controller for generating a reference read gate signal for determining a timing of starting reproduction processing of the data reproducing means; and a restart RG generation circuit for generating a restart read gate signal when recorded data are continuously reproduced from previous and next adjacent data sectors while the read channel is reproducing the data stored in one of the data sectors, the restart RG generation circuit generating the restart read gate signal for determining a timing of starting reproducing of the data stored in the next data sector, after the hard disk drive generates the sector signal corresponding to the next data sector and before the hard disk controller generates the reference read gate signal corresponding to the next data sector.

* * * * *